US009846627B2

(12) United States Patent
Solihin et al.

(10) Patent No.: US 9,846,627 B2
(45) Date of Patent: Dec. 19, 2017

(54) SYSTEMS AND METHODS FOR MODELING MEMORY ACCESS BEHAVIOR AND MEMORY TRAFFIC TIMING BEHAVIOR

(71) Applicant: North Carolina State University, Raleigh, NC (US)

(72) Inventors: Yan Solihin, Raleigh, NC (US); Yipeng Wang, Raleigh, NC (US); Amro Awad, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 15/044,044

(22) Filed: Feb. 15, 2016

(65) Prior Publication Data
US 2016/0239212 A1    Aug. 18, 2016

Related U.S. Application Data

(60) Provisional application No. 62/116,120, filed on Feb. 13, 2015.

(51) Int. Cl.
| | |
|---|---|
| *G06F 12/00* | (2006.01) |
| *G06F 13/00* | (2006.01) |
| *G06F 13/28* | (2006.01) |
| *G06F 11/30* | (2006.01) |
| *G06F 11/34* | (2006.01) |

(52) U.S. Cl.
CPC ...... *G06F 11/3037* (2013.01); *G06F 11/3447* (2013.01); *G06F 11/3452* (2013.01); *G06F 11/3461* (2013.01)

(58) Field of Classification Search
CPC .. G06F 11/30; G06F 11/3003; G06F 11/3037; G06F 11/34; G06F 11/3447; G06F 11/3452; G06F 11/3461; G06F 2201/86; G06F 2201/865; G06F 2201/88; G06F 2201/885
See application file for complete search history.

(56) References Cited

U.S. PATENT DOCUMENTS 5,274,811 A * 12/1993 Borg ................ G06F 11/3471
714/E11.203
5,615,357 A * 3/1997 Ball ................ G06F 11/3428
703/21
(Continued)

OTHER PUBLICATIONS

West: Cloning data cache behavior using Stochastic Traces; Balakrishnan et al; IEEE 18th International Symposium on High Performance Computer Architecture; Feb. 25-29, 2012 (12 pages).*

(Continued)

*Primary Examiner* — Daniel C Chappell
(74) *Attorney, Agent, or Firm* — Olive Law Group, PLLC

(57) ABSTRACT

Systems and methods for modeling memory access behavior and memory traffic timing behavior are disclosed. According to an aspect, a method includes receiving data indicative of memory access behavior resulting from instructions executed on a processor. The method also includes determining a statistical profile of the memory access behavior, the profile including tuple statistics of memory access behavior. Further, the method includes generating a clone of the executed instructions based on the statistical profile for use in simulating the memory access behavior.

26 Claims, 40 Drawing Sheets

(56) References Cited

U.S. PATENT DOCUMENTS

| | | | | |
|---|---|---|---|---|
| 5,920,719 | A * | 7/1999 | Sutton | G06F 11/3409 714/E11.192 |
| 5,999,721 | A * | 12/1999 | Colglazier | G06F 11/3461 703/14 |
| 6,971,092 | B1 * | 11/2005 | Chilimbi | G06F 11/3466 711/118 |
| 7,069,204 | B1 * | 6/2006 | Solden | G06F 11/3447 703/14 |
| 7,207,035 | B2 * | 4/2007 | Kobrosly | G06F 8/41 703/22 |
| 7,480,717 | B2 * | 1/2009 | Fellenstein | G06F 11/3414 709/223 |
| 7,640,154 | B1 * | 12/2009 | Clune | G06F 17/5009 700/67 |
| 7,644,192 | B2 * | 1/2010 | Dudley | G06F 11/3414 710/15 |
| 8,479,168 | B2 * | 7/2013 | Ike | G06F 11/3461 717/128 |
| 8,527,704 | B2 * | 9/2013 | Bivens | G06F 11/3409 703/2 |
| 8,700,380 | B2 * | 4/2014 | Kumazaki | G06F 11/3419 703/23 |
| 8,914,781 | B2 * | 12/2014 | Chilimbi | G06F 11/3447 717/104 |
| 8,997,063 | B2 * | 3/2015 | Krajec | G06F 11/3636 717/125 |
| 9,606,890 | B2 * | 3/2017 | Munetoh | G06F 11/073 |
| 9,720,797 | B2 * | 8/2017 | Broderick | G06F 11/3495 |
| 2003/0028864 | A1 * | 2/2003 | Bowen | G06F 8/48 717/141 |
| 2003/0033480 | A1 * | 2/2003 | Jeremiassen | G06F 8/4442 711/118 |

OTHER PUBLICATIONS

Runtime extraction of memory access information from the application source code; Ostadzadeh et al; 2011 International Conference on High Performance Computing and Simulation; Jul. 4-8, 2011; pp. 647-655 (9 pages).*
MRPSIM: A TLM based simulation tool for MPSOCS targeting dynamically reconfigurable processors; Han et al; 2008 IEEE International SOC Conference; Sep. 17-20, 2008; pp. 41-44 (4 pages).*
Exposing Memory Access Regularities Using Object-Relative Memory Profiling; Wu et al; Proceedings of the international symposium on Code generation and optimization: feedback-directed and runtime optimization; Mar. 20-24, 2004 (9 pages).*
A data-centric profiler for parallel programs; Liu et al; Proceedings of the International Conference on High Performance Computing, Networking, Storage and Analysis; Nov. 17-22, 2013 (12 pages).*
Awad Amro and Yan Solihin; "STM : Cloning the Spatial and Temporal Memory Access Behavior". IIEEE 20th International Symposium, p. 237-247(2014).
Badr, M et al. "SynFull: Synthetic Traffic Models Capturing Cache Coherent Behaviour". Computer Architecture (ISCA), 2014 ACM/IEEE 41st International Symposium. p. 109-120(2014).
Balakrishnan, G et al. "West: Cloning Data Cache Behavior using Stochastic Traces". High Performance Computer Architecture (HPCA), 2012 IEEE 18th International Symposium: 1-12(2012).
Balakrishnan, Ganesh. Abstract "Workload Cloning: Emulating Memory Hierarchy Behavior using Stochastic Traces". A dissertation submitted to the Graduate Faculty of North Carolina State University (2014).
Bell, Jr. R. H. and L. K. John. "Improved automatic testcase synthesis for performance model validation." In Proceeding of ICS, p. 111-120, (2005).
Bell, Jr. Robert et al. "Efficient Power Analysis using Synthetic Testcases. Workload Characterization Symposium". Proceedings of the IEEE International, p. 110-118 (2005).

Binkert, N et al. "The gem5 Simulator." ACM SIGARCH Computer Architecture News 39 (2): 1-7(2011).
Curnow, H.J. et al. "A Synthetic Benchmark." The Computer Journal 19 (1): 43-49. (1976).
Delimitrou, C. et al. "Storage i/o generation and replay for datacenter applications." In Performance Analysis of Systems and Software (ISPASS), 2011 IEEE International Symposium on, p. 123-124 (2011).
Deniz, E et al. "Minime: Pattern-Aware MulticoreBenchmark Synthesizer." IEEE Transactions on Computers, 64(8): 2239-2252 (2015).
Deniz, E. et al. "Using software architectural patterns for synthetic embedded multicore benchmark development." Proceedings of the 2012 IEEE International Symposium on Workload Characterization (IISWC) p. 89-99(2012).
Eeckhout, K. et al. "Performance Analysis Through Synthetic Trace Generation." IEEE International. Symposium on Performance Analysis of Systems and Software. p. 1-6 (2000).
Ertvelde L. V et al. Benchmark synthesis for architecture and compiler exploration. In Proceedings of the IEEE International Symposium on Workload Characterization (IISWC). p. 106-116(2010).
Ertvelde, L. Van et al. "Dispersing Proprietary Applications as Benchmarks through Code Mutation." In Architectural Support for Programming Languages and Operating Systems. p. 201-210(2008).
Ferrari, D. "On the foundations of artificial workload design". Proceedings of the 1984 ACM Sigmetrics conference on Measurement and modeling of computer systems, p. 8-14(1984 ).
Ganesan, K. et al. "Synthesizing memory-level parallelism aware miniature clones for SPEC CPU2006 and ImplantBench workloads." In Proc. of ISPASS, p. 33-44(2010).
Ganesan, K. et al. "Automatic generation of miniaturized synthetic proxies for target applications to efficiently design multicoreprocessors." IEEE Transactions on Computers, 99(4): 833-846(2013).
Hill, M. D. and A.J. Smith. "Evaluating Associativity in CPU Caches". IEEE Transactions on Computers, 38:1612-1630(1989).
John L Henning, "SPEC CPU2006 benchmark descriptions". ACM SIGARCH Computer Architecture News,34(4): 1-17 (2006).
Joshi, A. et al. "The Return of Synthetic Benchmarks". 2008 SPEC Benchmark Workshop, 2008.
Joshi, A. et al. "Automated microprocessor stressmark generation". Proc. of IEEE 14th International Symposium on High Performance Computer Architecture, p. 229-239 (2008).
Joshi, A. et al. "Performance Cloning: A Technique for Disseminating Proprietary Applications as Benchmarks". IEEE International Symposium on Workload Characterization, p. 105-115 (2006).
Jouppi, N.P. "Improving Direct-Mapped Cache Performance by the Addition of a Small Fully-Associative Cache and Prefetch Buffers". ISCA '90 Proceedings of the 17th annual international symposium on Computer Architecture. p. 364-373 (1990).
Kurmas, Z et al. "Synthesizing Representative I/O Workloads Using Iterative Distillation". Proceedings of the 11th IEEE/ACM International Symposium on Modeling, Analysis and Simulationof Computer Telecommunications Systems. p. 6-15(2003).
Mattson, R. L. et al. "Evaluation techniques for storage hierarchies." IBM Systems Journal, 9(2): 78-117 (1970).
Perelman, E. et al. "Using SimPoint for accurate and efficient simulation". In Proc. of Joint Intl. Conf. on Measurement and Modeling of Comp. Systems (Sigmetrics). p. 318-319 (2003).
Rogers, B et al. "Scaling the Bandwidth Wall: Challenges in and Avenues for CMp.Scaling". Proceeding of 36th International Symposium on Computer Architecture. p. 371-382(2009).
Rosenfeld, P et al. "DRAMSim2: A cycle accurate memory system simulator." IEEE Computer Architecture Letter,10(1): 16-19(2011).
Sreenivasan, K. et al. "On the construction of a representative synthetic workload". Communications of the ACM, 17 (3): 127-133 (1974).
Weicker, R.P. "Dhrystone: a synthetic systems programming benchmark". Communications of the ACM, 27(10): 1013-1030 (1984).

* cited by examiner

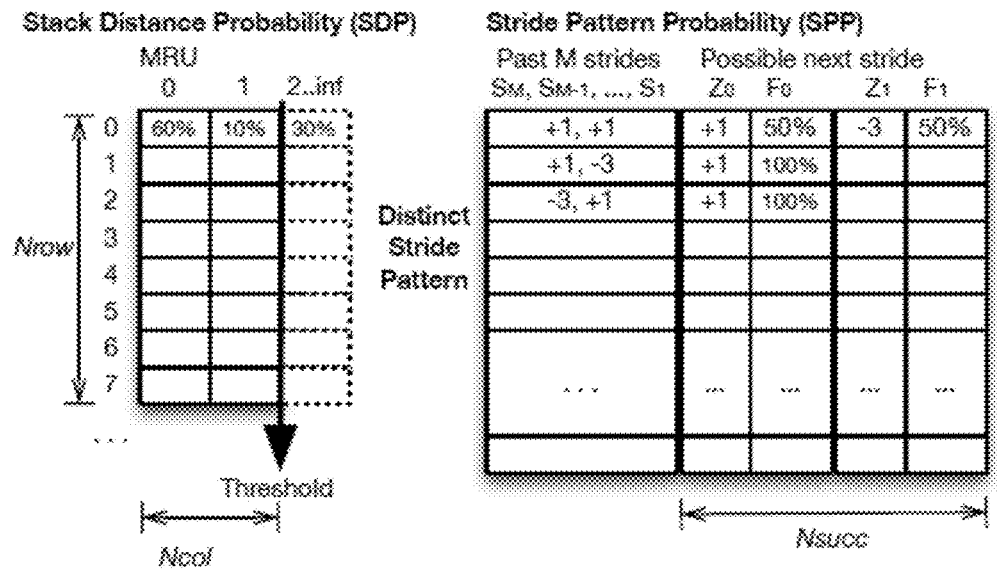

| Symbol | Meaning |
|---|---|
| $SDC_{ij}$ | Stack distance count table, keeping a count of accesses at row $i$ and column $j$ |
| $SDP_{ij}$ | Stack distance probability table, keeping probability of accessing column $j$ over any columns in row $i$ |
| $N_{rows}$ | Number of rows in the stack distance profile |
| $N_{cols}$ | Number of columns in the stack distance profile |
| $SPC_{S_N,...,S_1|Z_k}$ | Stride pattern count table, keeping counts of transitions from past stride $S_N, ..., S_1$ to next stride $Z_k$ |
| $SPP_{S_N,...,S_1|Z_k}$ | Stride pattern probability table, keeping the probability of transitioning from past stride $S_N, ..., S_1$ to next stride $Z_k$ over any values of $k$ |
| $M$ | Number of the most recent stride values in the stride pattern |
| $N_{succ}$ | Number of possible successor strides |
| $f_{SD}$ | Fraction of accesses that update the SD tables |
| $f_{wr}$ | Fraction of accesses that are writes |

FIG. 4

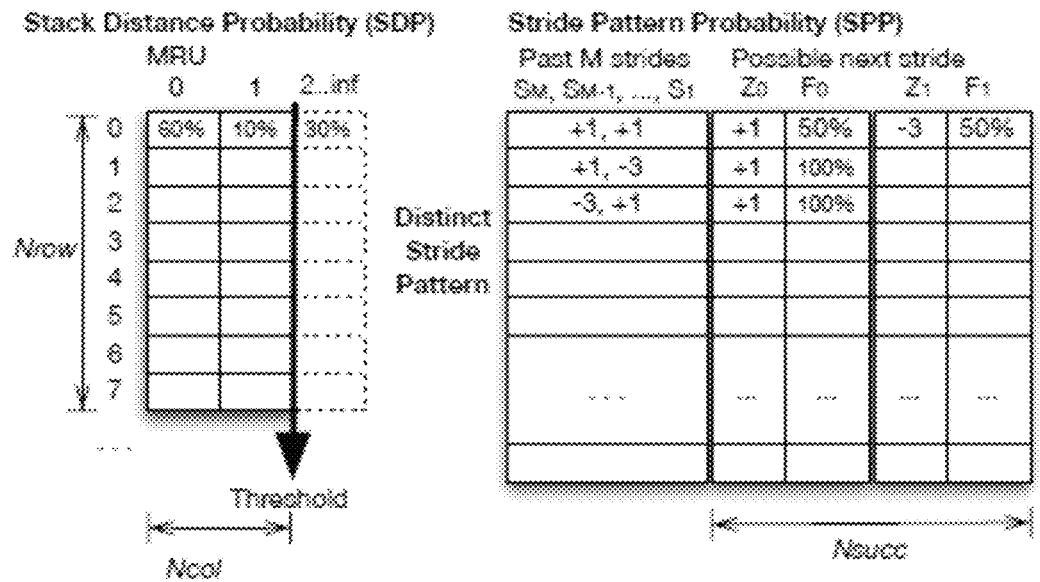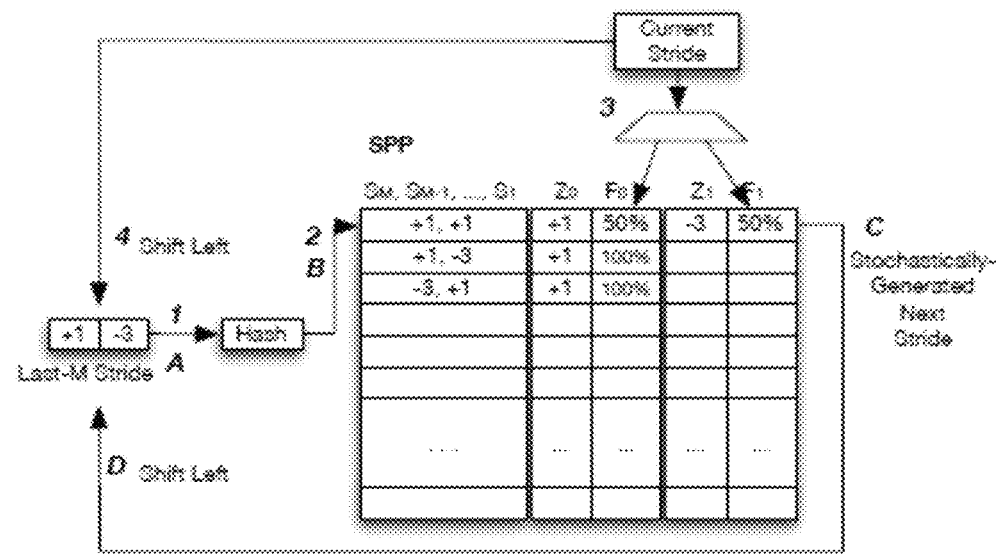
FIG. 12

SYSTEMS AND METHODS FOR MODELING MEMORY ACCESS BEHAVIOR AND MEMORY TRAFFIC TIMING BEHAVIOR

CROSS REFERENCE TO RELATED APPLICATION

This application claims the benefit of U.S. Provisional Patent Application Ser. No. 62/116,120, titled SYNTHETIC GENERATION OF CLONE APPLICATIONS and filed Feb. 13, 2015, the disclosure of which is incorporated herein by reference in its entirety.

FEDERALLY SPONSORED RESEARCH OR DEVELOPMENT

This invention was made with government support under grant number 1116540 awarded by the National Science Foundation (NSF). The government has certain rights to this invention.

TECHNICAL FIELD

The presently disclosed subject matter relates to computer systems modeling. Particularly, the presently disclosed subject matter relates to systems and methods for modeling memory access behavior and memory traffic timing behavior.

BACKGROUND

Computer architects need a deep understanding of clients' workload in order to design and tune architecture. Unfortunately, many important clients will not share their software to computer architects due to the proprietary or confidential nature of their software. Examples include weapons simulation software, trading algorithm software, and software that handles trade secrets, or clients' sensitive date. This problem of proprietary workload is widespread in the industry. One practice in dealing with the proprietary workload is for computer architects to substitute the workload using non-proprietary versions (e.g., open source) or for clients to provide hints of the algorithms used in their workloads (e.g., a highly-connected large graph algorithm), and it is up to computer architects to manually reconstruct software that fit that description. The process usually requires huge time investments and deep subject expertise. A promising alternative is to clone the workload, a process of extracting a statistical summary of the behavior of the client's workload through profiling, followed by generating a synthetic workload (a clone) that produces the same statistical behavior. Workload cloning can be automated, relieving the highly manual efforts needed otherwise.

One particular aspect of workload cloning that has not provided a satisfactory solution thus far is cloning of memory access behavior. Most prior cloning solutions have focused on the instruction level parallelism behavior. However, it is desired to provide good cloning techniques in the memory access behavior space. For one reason, the cache hierarchy is becoming larger and more complex. Understanding how workloads perform in such a large and complex subsystem is crucial. In another reason, the growth in the number of cores puts a tremendous pressure on the memory hierarchy, shifting the bottleneck of performance from cores to the memory hierarchy. In another reason, due to cores sharing some parts of the memory hierarchy, proprietary workloads cannot be evaluated in isolation, but in combination with other co-running workloads.

For at least the aforementioned reasons, there is a need for improved techniques for generating clones that better model workloads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are memory access behavior cloning systems and methods that capture both temporal and spatial locality. Such techniques or schemes may be referred to herein as "Spatio-Temporal Memory" (STM) clones. It is noted that it is common for applications to access data from multiple streams with varying stride values and varying stride lengths, such that they appear irregular. Therefore, the spatial locality behavior can be captured using a transition probability table indexed by stride history pattern. It was found that by capturing temporal and spatial locality accurately, STM can reproduce memory behavior even in the case of prefetchers, varied cache block sizes, and varied page sizes.

According to an aspect, a method includes receiving data indicative of memory access behavior resulting from instructions executed on a processor. The method also includes determining a statistical profile of the memory access behavior, the profile including tuple statistics of memory access behavior. Further, the method includes generating a clone of the executed instructions based on the statistical profile for use in simulating the memory access behavior.

According to another aspect, a method includes receiving data indicative of memory access behavior resulting from instructions executed on a processor and cache hierarchy. The method also includes determining a statistical profile of the memory access behavior, the statistical profile indicating feedback loop timing information of the memory access behavior. Further, the method includes generating a clone of the executed instructions based on the statistical profile for use in simulating the memory access behavior.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 4 depicts example profiling structures in accordance with embodiments of the present disclosure;

FIG. 12 depicts a diagram of an example of how SPP is used during profiling and trace clone generation;

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The present disclosure is generally drawn, inter alia, to methods, apparatus, systems, devices, and computer program products related to data storage based on memory persistency.

Briefly stated, technologies are generally described for profiling memory access stream behavior and generating a clone or synthetic application based on the profile in accordance with embodiments of the present disclosure.

Figure 1:
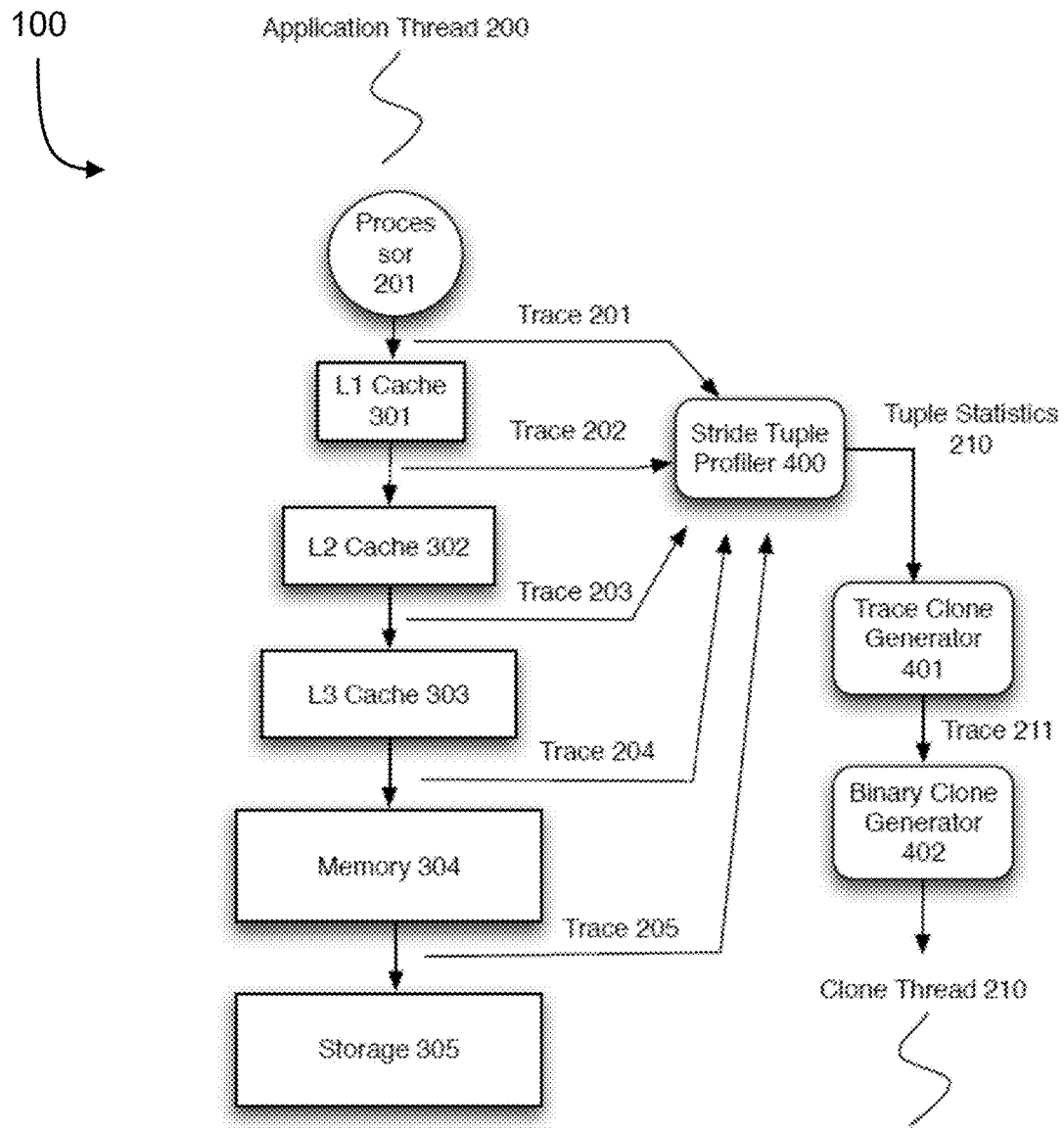
FIG. 1 is a block diagram of an example system operable for use in profiling memory access stream behavior and generating a clone or synthetic application based on the profile in accordance with embodiments of the present disclosure.

FIG. 1 illustrates a block diagram of an example system 100 operable for use in profiling memory access stream behavior and generating a clone or synthetic application based on the profile in accordance with embodiments of the present disclosure. Referring to FIG. 1, system 100 may be implemented entirely or at least partially by a suitable apparatus or a device such as a computing device (e.g., a server, a desktop computer, a laptop computer, a smartphone or the like). System 100 may include one or more units such as processors, controllers, or the like. System 100 may run an application thread 200. An application thread is a thread of execution of an application program. An application program may have one or more application threads. A cache is a hardware-managed memory that holds data or instructions temporarily. A cache is smaller but faster than the main memory. Application thread 200 may represent, for example, a thread of execution of an original proprietary application.

In this example, system 100 include a processor 201, a Level 1 (L1) cache 301, a Level 2 (L2) cache 302, a Level 3 (L3) cache 303, a memory 304, and/or a storage 305. It should be recognized by those of skill in the art that L1 cache 301, L2 cache 302, L3 cache 303, memory 304, and storage 305 are generally memory components. It is noted that a cache may include a software-managed memory, sometimes referred to as scratchpad memory. A main memory is the main structure that holds application data and instructions. A storage can be a non-volatile keeper of files and data that must be retained upon a power failure.

Memory access stream (or trace) may be produced by the processor 201 and various caches/memory/storage, such as L1 cache 301, L2 cache 302, L3 cache 303, memory 304, and storage 305, as a result of executing instructions from the application thread 200. Instructions such as load instructions or store instructions can produce a stream of memory accesses. The stream of memory accesses may be filtered by various caches/memory/storage. For example, the stream of memory accesses produced by the processor 201 and supplied to L1 cache 301 can form trace 201. The stream of memory accesses produced by the processor 201, filtered by the L1 cache 301, supplied to L2 cache 302, may form trace 202. The stream of memory accesses produced by the processor 201, filtered by the L1 cache 301 and L2 cache 302, supplied to L3 cache 303, may form trace 203. The stream of memory accesses produced by the processor 201, filtered by the L1 cache 301, L2 Cache 302, and L3 Cache 303, supplied to memory 304, may form trace 204. The stream of memory accesses produced by the processor 201, filtered by the L1 cache 301, L2 cache 302, L3 cache 303, and memory 304, supplied to storage 305, may form trace 205.

Traces 201, 202, 203, 204, and 205 may be inputs to a stride tuple profiler 400. The stride tuple profiler 400 may be configured to summarize the behavior of the traces 201, 202, 203, 204, and 205 via tuple statistics 210. Tuple statistics 210 may be an input to a trace clone generator 401. The trace clone generator 401 may produce trace 211. Trace 211 may be a stream of memory accesses that are synthetic, and may represent closely the behavior of the original traces 201, 202, 203, 204, and/or 205. Trace 211 may be input to binary clone generator 402, which generates a clone thread (or synthetic program thread) 210. Clone thread 210 may be run on the processor 201 and may generate memory access stream that is similar or closely represents the application thread 200.

Figure 2:
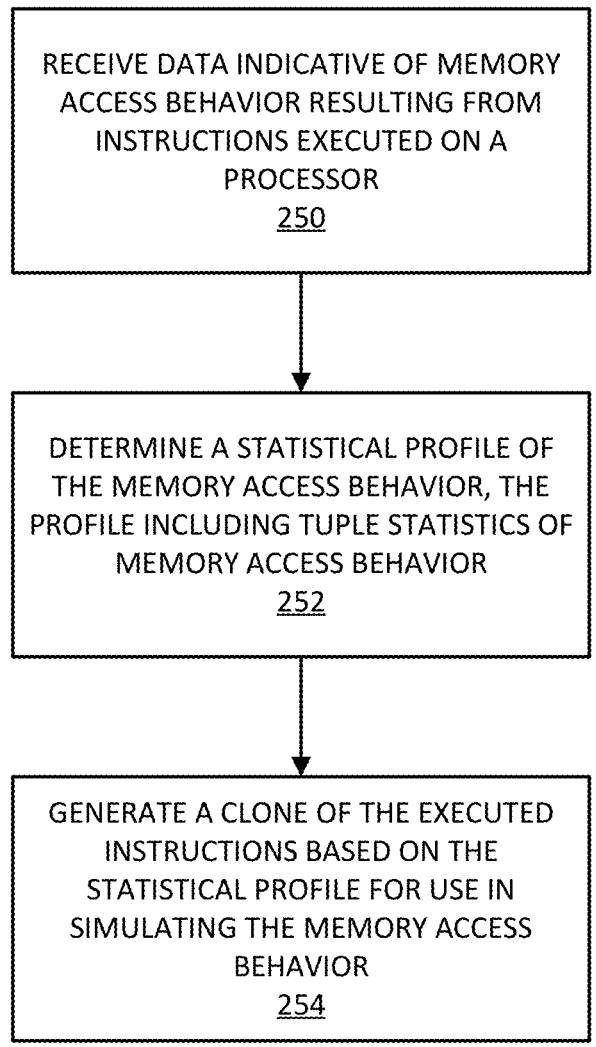
FIG. 2 is a flow chart of an example method for profiling memory access stream behavior and generating a clone or synthetic application based on the profile in accordance with embodiments of the present disclosure.

FIG. 2 illustrates a flow chart of an example method for profiling memory access stream behavior and generating a clone or synthetic application based on the profile in accordance with embodiments of the present disclosure. The example method of FIG. 2 may be implemented by any suitable system. In the description of FIG. 2, reference is made by example to the system 100 of FIG. 1, although it should be understood that the method may be implemented by any suitable system, such as a computing device.

Referring to FIG. 2, the method includes receiving 250 data indicative of memory access behavior resulting from instructions executed on a processor. For example, the system 100 shown in FIG. 1 may execute instructions from the application thread 200. One or more traces may be generated by the processor 201 as a result of the executed instructions. For example in FIG. 1, traces 201, 202, 203, 204, and 205 are generated and received by the stride tuple profiler 400.

The method of FIG. 2 also includes determining 252 a statistical profile of the memory access behavior, the profile including tuple statistics of memory access behavior. Continuing the aforementioned example, the stride tuple profiler 400 may generate tuple statistics 210 to summarize the behavior of the traces 201, 202, 203, 204, and 205.

The method of FIG. 2 includes generating 254 a clone of the executed instructions based on the statistical profile for use in simulating the memory access behavior. Continuing the aforementioned example, the trace clone generate 401 may product trace 211, which may be a stream of memory accesses that are synthetic, and may represent closely the behavior of the original traces 201, 202, 203, 204, and/or 205.

Figure 3:
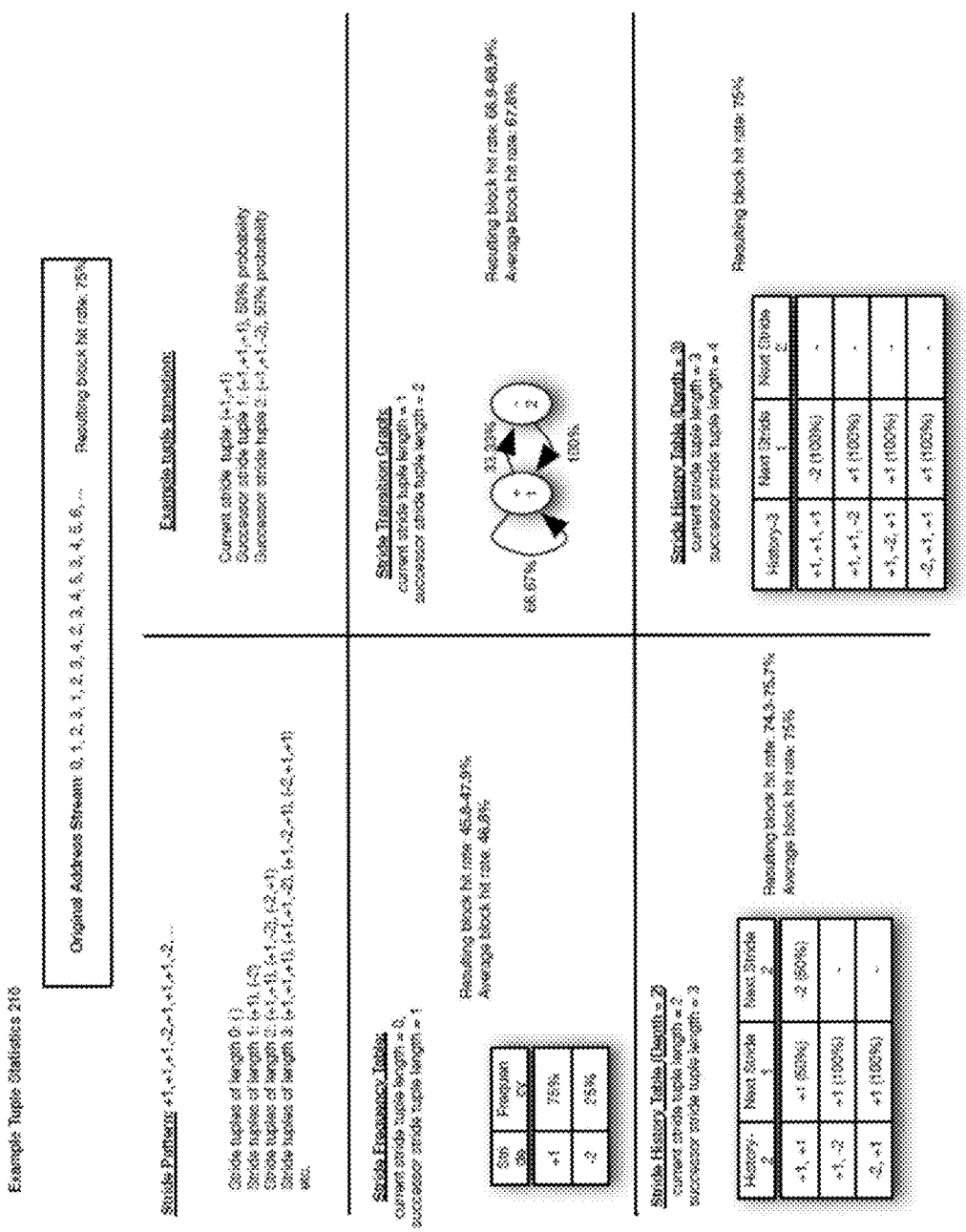
FIG. 3 depicts examples of tuple statistics in accordance with embodiments of the present disclosure.

FIG. 3 depicts examples of tuple statistics 210 in accordance with embodiments of the present disclosure. Referring to FIG. 3, the figure shows an example of the following memory access stream at a cache block level: 0, 1, 2, 3, 1, 2, 3, 4, 2, 3, 4, 5, 3, 4, 5, 6, . . . , (top box). Memory access stream may be at a smaller or larger granularity than the cache block size depicted in the example. The access pattern shows an example block address stream, containing both spatial and temporal locality behavior. For simplicity, it is assumed that the cache is fully-associative with size of 4 cache blocks and it uses Least Recently Used (LRU) replacement policy. Therefore, the access pattern can cause the cache to miss once per 4 accesses on average; because the address pattern introduces a new cache block after each 3 hits on the cache, generating a hit rate of 75% for a trace length of 100,000 accesses.

In the top left portion of FIG. 3, the stride pattern that corresponds to the original memory access stream is shown. A stride is the difference in an address in a memory access stream and the address immediately preceding that. For example, the first stride "+1" is obtained from subtracting address "1" by address "0", the second stride "+1" is obtained from subtracting address "2" by address "1", the third stride "+1" is obtained from subtracting address "3" by address "2", the fourth stride "−2" is obtained from subtracting address "1" by address "3", and so on.

A tuple may be a sequence of addresses that is a consecutive subset of the stride pattern. A tuple may have a different length, where length indicates the number of addresses that appear in the sequence. For example, a stride of tuple length 0 is a null set ( ). A stride of tuple length 1 includes tuple (+1), (−2). A stride of tuple length 2 includes tuple (+1, +1), (+1, −2), and (−2, +1). Each tuple with a length of 2 appears in the stride pattern as two consecutive strides. A stride of tuple length 3 includes tuple (+1, +1, +1), (+1, +1, −2), (+1, −2, +1), and (−2, +1, +1). Each tuple of a length of 3 appears in the stride pattern as three consecutive strides. Other tuple lengths may be used. The longest tuple length may be equal to the number of strides in the stride pattern.

In the top right portion of FIG. 3, an example of tuple transition is shown. A first tuple of length N may transition to a second tuple of length N+1, if the first N strides in the second tuple are identical to the strides in the first tuple. A second tuple that satisfies that characteristics is referred to as "successor tuple." The last stride in a successor tuple is referred to as a "successor stride." There may be more than one successor tuple for a given tuple. In FIG. 3, a tuple (+1, +1) may transition to a successor tuple (+1, +1, +1) with a successor stride "+1" or to a successor tuple (+1, +1, −2)

with a successor stride "−2". For a given tuple, the number of occurrences of a successor tuple divided by the number of occurrences of all possible successor tuples is an estimate of the probability of the successor tuple. In FIG. 3, successor tuple (+1, +1, +1) and successor tuple (+1, +1, −2) each has 50% probability because they appear just as frequently in the stride pattern.

In the middle left portion of FIG. 3, an example of tuple statistics 210 is shown. The tuple statistics consists of a current tuple length of 0, and a successor tuple length of 1. Successor tuple probabilities in this case are equivalent to the frequency of occurrences of stride "+1" or stride "−2" divided by the total number of stride occurrences. For example, stride "+1" has a probability of 75% because three out of four strides are +1 strides. Stride "−2" has a probability of 25% because one out of four strides are −2 strides.

In the middle right portion of FIG. 3, an example of tuple statistics 210 is shown. The tuple statistics includes a current tuple length of 1, and a successor tuple length of 2. For example, a tuple (+1) may be succeeded by successor tuple (+1, +1) with a probability of 66.67%, successor tuple (+1, −2) with a probability of 33.33%. A tuple (−2) may be succeeded by successor tuple (−2, +1) with a probability of 100%, successor tuple (−2, −2) with a probability of 0%. A stride transition graph visually represents tuple transition probabilities.

In the bottom left portion of FIG. 3, an example of tuple statistics 210 is shown. The tuple statistics includes a current tuple length of 2, and a successor tuple length of 3. For example, a tuple (+1, +1) may be succeeded by successor tuple (+1, +1, +1) with a probability of 50%, successor tuple (+1, +1, −2) with a probability of 50%. These are shown in the first row of the stride history table. Next Stride in the stride history table shows the successor stride that form the successor tuple.

In the bottom right portion of FIG. 3, an example of tuple statistics 210 is shown. The tuple statistics includes a current tuple length of 2, and a successor tuple length of 3. For example, a tuple (+1, +1, +1) may be succeeded by successor tuple (+1, +1, +1, −2) with a probability of 100%, as shown in the first row of the stride history table. Next Stride in the stride history table shows the successor stride that forms the successor tuple.

Overall, the longer the tuple, the deeper the stride history captured by the tuple, and the greater the accuracy of the tuple statistics in capturing the original memory stream behavior. For example, as the tuple length increases, the average block hit rate approximates the original hit rate closer: 46.8% for current stride tuple length of 0, 67.8% for the current stride tuple length of 1, 75% for current stride tuple length of 2, and 75% for current stride tuple length of 3. 75% is the block hit rate of the original memory access stream.

FIG. 4 depicts example profiling structures in accordance with embodiments of the present disclosure. Referring to FIG. 4, on the left is a stack distance probability (SDP) table showing the probability of accessing the most recently used entry (stack position 0), second most recently used entry (stack position 1), and all other stack positions. As an example, the probability for stack position 0, 1, and all others for the first set can be 60%, 10%, and 30%, respectively. On the right is a stride pattern probability (SPP) table showing what possible stride values (and their probabilities) follow a specific past stride pattern. This table is also shown in the bottom left and bottom right portion of FIG. 3. Several notations can be noted: M represents the depth of the stride history pattern, (Z0, F0) denote the first stride value and probability for the specific stride history pattern, (Z1, F1) denote the second stride value and probability for the specific stride history pattern, etc.

FIG. 4 also shows symbols that are used for discussion and their meanings. Both stack distance (SD) and stride pattern (SP) profiles are gathered. The "C" or "P" suffix are added to them to distinguish a count statistics versus a probability statistics. SD profiles are kept in a table with Nrow rows and Ncol columns. The SP profiles are kept in a table, each entry is hash indexed using a stride pattern of the last M stride values, and keeps Nsucc possible successor stride values.

During profiling, the SD tables are updated by keeping the tags of blocks that are most recently used, depending on the number of rows and columns of the SD tables. When there is a new address that is accessed, the address is first compared against tags in the SD tables. If there is a tag match, then the appropriate entry in the SD tables is updated appropriately, i.e. SDCij is incremented and SDPij is adjusted accordingly. If there is no tag match, the SP tables are updated, as depicted in FIG. 4. The history of the last M stride value is kept (Step 1), and is given to a hash function to index the SP tables (Step 2) to access the appropriate entry in the tables.

For the new address that is accessed, the new stride value is calculated by subtracting the address of the new access with the last access. It is then compared against one of the successor stride values in the tables (Step 3) to see if there is a match. If there is a match, the appropriate entry is updated by incrementing the matching stride count in the SPC table and adjusting the probability number in the SPP table. If there is no match, a new successor stride is entered into the table, and the count and probability are updated.

Other statistics may be collected during profiling. A fraction of accesses that update the SD tables (and not the SP tables) is denoted as $f_{SD}$. The number of writes (or accesses due to store instructions) in order to obtain the probability of an access to be a read or a write is also collected.

Figure 5:
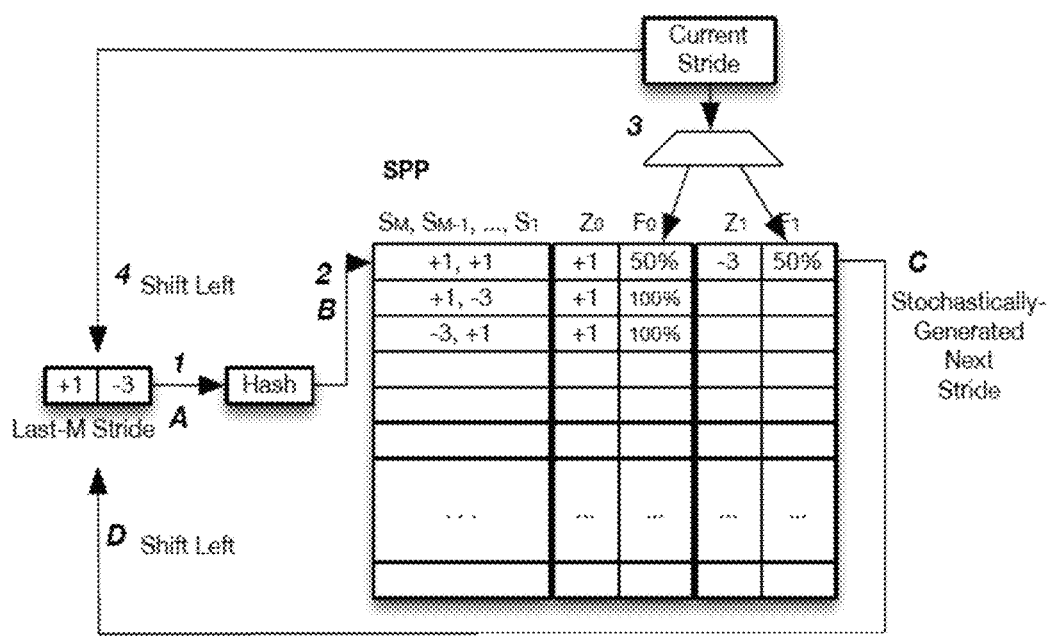
FIG. 5 is a diagram of an example clone generation method in accordance with embodiments of the present disclosure.

FIG. 5 illustrates a diagram of an example clone generation method in accordance with embodiments of the present disclosure. In this example, SP tables are maintained with the same configurations as used for profiling. The first step in generation is adjustment or scaling. The user starts out by determining the number of memory references desired for the clone. Suppose that the original number of memory references is Norig and the desired number of memory references in the clone is Nnew. All the SDC and SPC tables' content are adjusted by multiplying each element in the tables with the scaling ratio Nnew/Norig.

The next step in the clone generation is to choose whether to use the SD or SP profile. To do this, a random number R1 in [0,1] may be generated. If $R1 < f_{SD}$, the next access can be generated using the SD tables, otherwise the SP tables. Then whether the access is a read or a write may be determined by generating a random number R2 in [0,1]. If $R2 < f_{wr}$, a write may be generated, otherwise a read. Then another random number R3 is generated to select a row i in the SD table, and another random number R4 to select a column j in the selected SD table row, all according to the statistical distribution in SDPij relative to other rows and columns in the selected row. The tag in the ith row and jth column is the address assigned to the new access. Subsequently, the SD tables are updated.

If $R1 \leq f_{SD}$, the next access is generated using the SP tables, as illustrated in FIG. 5. To do this, the last M strides can be used in the stride pattern history: $S_M, \ldots, S_1$ (Step A in the figure). The stride pattern history can subsequently be used to index the SPP through a hashing function and pattern tag matching (Step B). If the appropriate entry is found, then another random number R5 is generated that picks a successor stride value Zk based on the probability distribution of all successor values in the entry (Step C). The $SPC_{SM, \ldots, S1, Zk}$ may then be decremented by one and $SPP_{S\_M, \ldots, S\_1|Z\_u}$ for u=1, $N_{succ}$ may be recalculated. Then, the stochastically generated new stride value is left shifted into the stride pattern history (Step D).

The final few steps (not shown in the figure) include generating a random number to select a write vs. read access, updating the SP tables to reflect the new count and probability of the new stride, calculating the new address by adding the last access address to the new stride, and updating the SD tables to reflect a new address being accessed.

This process may be repeated until Nnew accesses have been generated or until relevant entries in the SP tables are exhausted.

Finally, in case the desired output is an executable clone, a C++ code which contains the memory references in the trace file may be generated.

Figure 6:
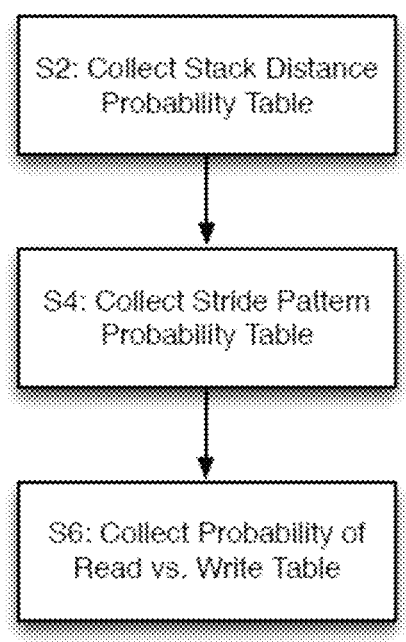
FIG. 6 is a flow chart of an example method for implementing tuple statistics profiling, arranged in accordance with embodiments of the present disclosure.

FIG. 6 illustrates a flow chart of an example method for implementing tuple statistics profiling, arranged in accordance with embodiments of the present disclosure. The method in FIG. 6 may be implemented using, for example, system 100 shown in FIG. 1. An example process may include one or more operations, actions, or functions as illustrated by one or more of blocks S2, S4, and/or S6. Blocks S2, S4, and S6 can together describe a process that collects the tuple statistics that are needed for the clone profiling and generation. Although illustrated as discrete blocks, various blocks may be divided into additional blocks, combined into fewer blocks, supplemented with additional blocks representing other operations, actions, or functions, or eliminated, depending on the particular implementation.

Figure 7:
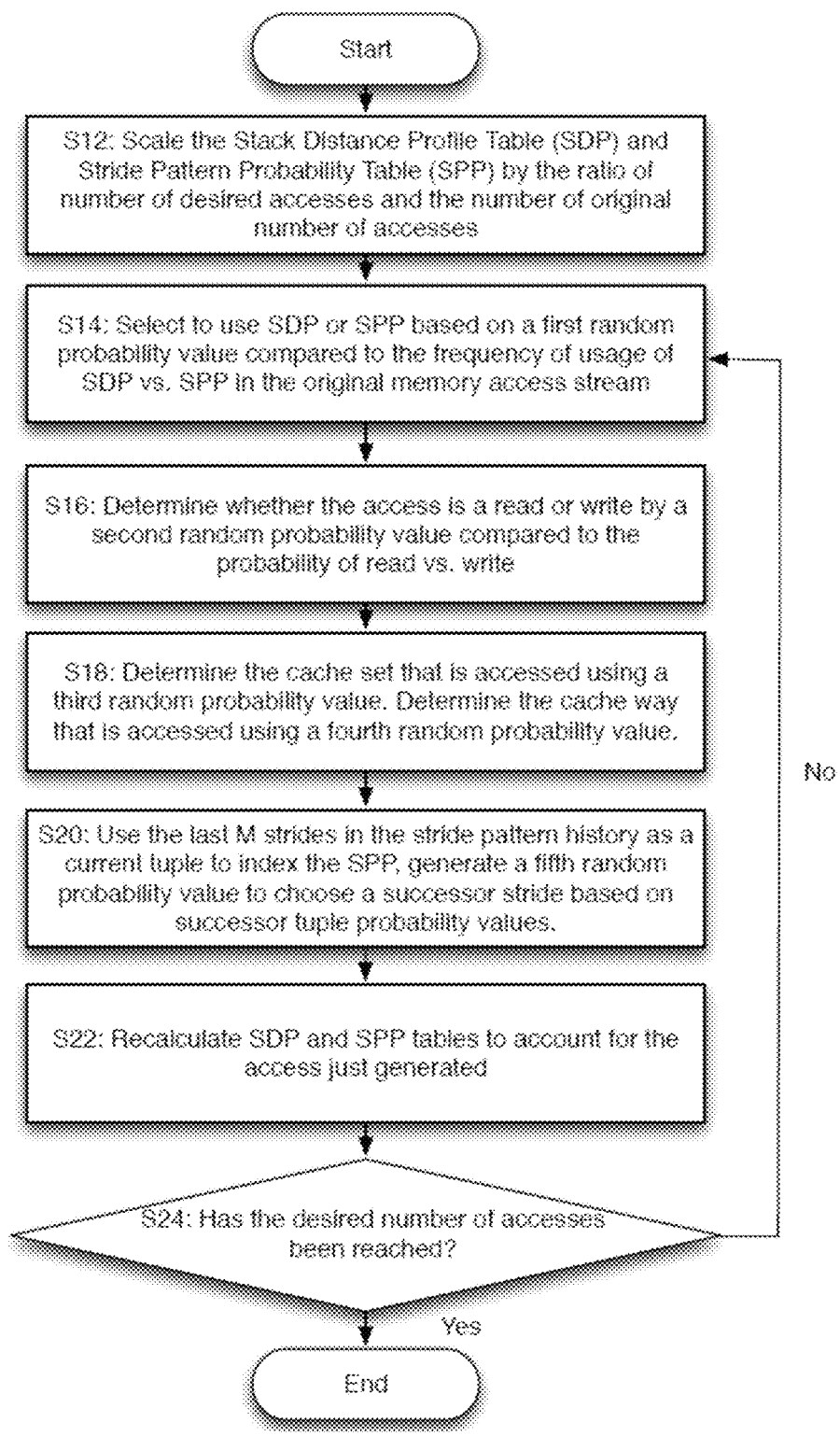
FIG. 7 is a flow chart of an example method for generating clone memory access stream, arranged in accordance with embodiments of the present disclosure.

FIG. 7 illustrates a flow chart of an example method for generating clone memory access stream, arranged in accordance with embodiments of the present disclosure. The method in FIG. 7 may be implemented using, for example, system 100 shown in FIG. 1. An example method may include one or more operations, actions, or functions as illustrated by one or more of blocks S12, S14, S16, S18, S20, S22, and/or S24. Blocks S12-S24 together describe a process that uses tuple statistics to generate a clone. Although illustrated as discrete blocks, various blocks may be divided into additional blocks, combined into fewer blocks, supplemented with additional blocks representing other operations, actions, or functions, or eliminated, depending on the particular implementation.

Figure 8:
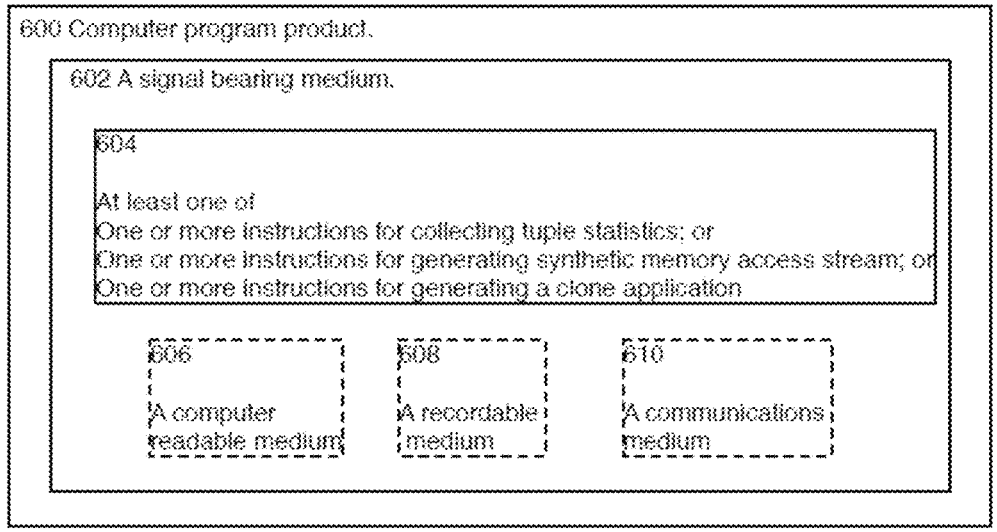
FIG. 8 is an example computer program product that can be utilized to implement data storage based on memory persistency, arranged in accordance with at least some embodiments described herein.

FIG. 8 illustrates an example computer program product that can be utilized to implement data storage based on memory persistency, arranged in accordance with at least some embodiments described herein. Computer program product 600 may include a signal bearing medium 602. Signal bearing medium 602 may include one or more instructions 604 that, in response to execution by, for example, a processor, may provide the functionality and features described herein, for example with respect to FIGS. 1-7.

In some implementations, signal bearing medium 602 may encompass a computer-readable medium 606, such as, but not limited to, a hard disk drive, a compact disc (CD), a digital video disk (DVD), a digital tape, memory, and the like. In some implementations, signal bearing medium 602 may encompass a recordable medium 608, such as, but not limited to, memory, read/write (R/W) CDs, R/W DVDs, etc.

In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

Figure 9:
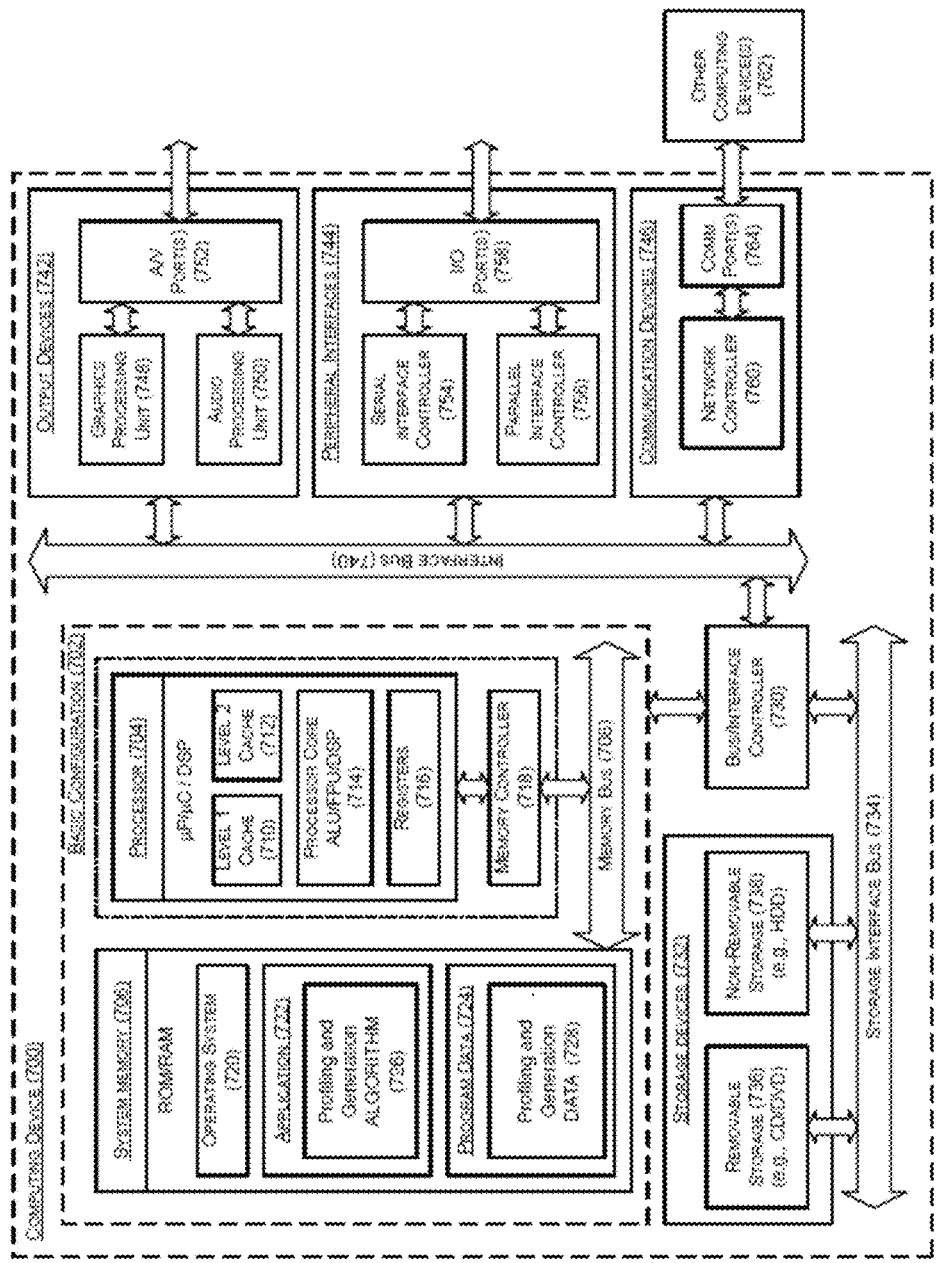
FIG. 9 is a block diagram of an example computing device that can be utilized to implement data storage based on memory persistency, arranged in accordance with embodiments of the present disclosure.

FIG. 9 illustrates a block diagram of an example computing device that can be utilized to implement data storage based on memory persistency, arranged in accordance with embodiments of the present disclosure. In a very basic configuration 702, computing device 700 (which may be embodied by the previously described computing device 102) typically includes one or more processors 704 (which may be the previously described processor 110) and a system memory 706. A memory bus 708 may be used for communicating between processor 704 and system memory 706. The various components (e.g., caches, operating system, and the like) shown and described herein with respect to computing device 700 may be embodied by the various analogous components shown and described above with respect to FIGS. 1-7.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720 (which may be the previously described operating system 108), one or more applications 722, and program data 724. Application 722 may include a profiling and generation algorithm 726 that is arranged to perform the functions and operations as described herein including those described with respect to FIGS. 1-6 in connection with system 100. Program data 724 may profiling and generation data 728 that may be useful for implementation of tuple statistics profiling and clone generation as is described herein. In some embodiments, application 722 may be arranged to operate with program data 724 in cooperation with operating system 720 such that implementations of data storage based on data persistency may be provided. This described basic configuration 702 is illustrated in FIG. 9 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

Figure 10:
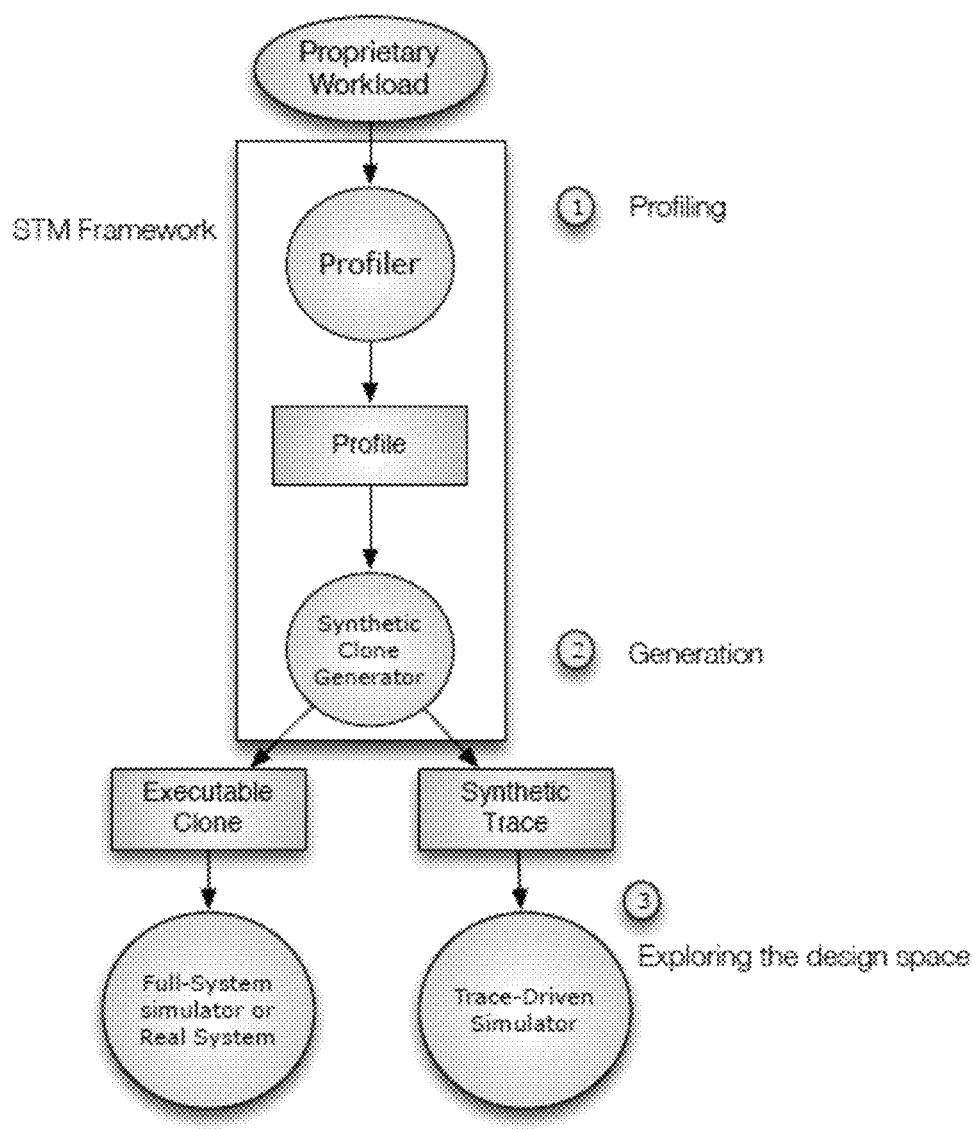
FIG. 10 is a high-level view of an STM framework.

A goal of STM is to gather sufficient memory access trace behavior statistics from applications and generate clones that produce memory access trace behavior that match the statistics. The memory accesses that are profiled by STM can be from the stream of data accesses coming out of the processor core before reaching the L1 cache. Thus, the data access streams have not been filtered yet by any cache, and represent virtual address trace inherent to the application and instruction set architecture (ISA). STM is not concerned with the timing of these accesses. Timing is intricately linked with the microarchitecture of the processor core, the access latencies and bandwidths in various memory hierarchy levels, and their feedback loop effect on the processor pipeline. Replicating the timing effect involves many issues that are different from STM's goal of replicating memory access trace behavior. STM may use a suitable framework such as the example shown in FIG. 10, which illustrates a high-level view of an STM framework. Initially, the binary-instrumented proprietary workload may be run on a real hardware or non-instrumented binary on a simulator. As the binary runs, statistical profiles may be collected, without storing traces from the original proprietary workload. The profiling output can be examined by clients so they are assured no proprietary data or information are leaked. The statistical profile is subsequently input into the clone generator, which generates either a synthetic trace of memory references (a trace clone), or an executable (a binary clone). A trace clone can be used for input to a trace-driven simulator, while a binary clone can be used for input to an execution-driven simulator or a real system.

Figure 11:
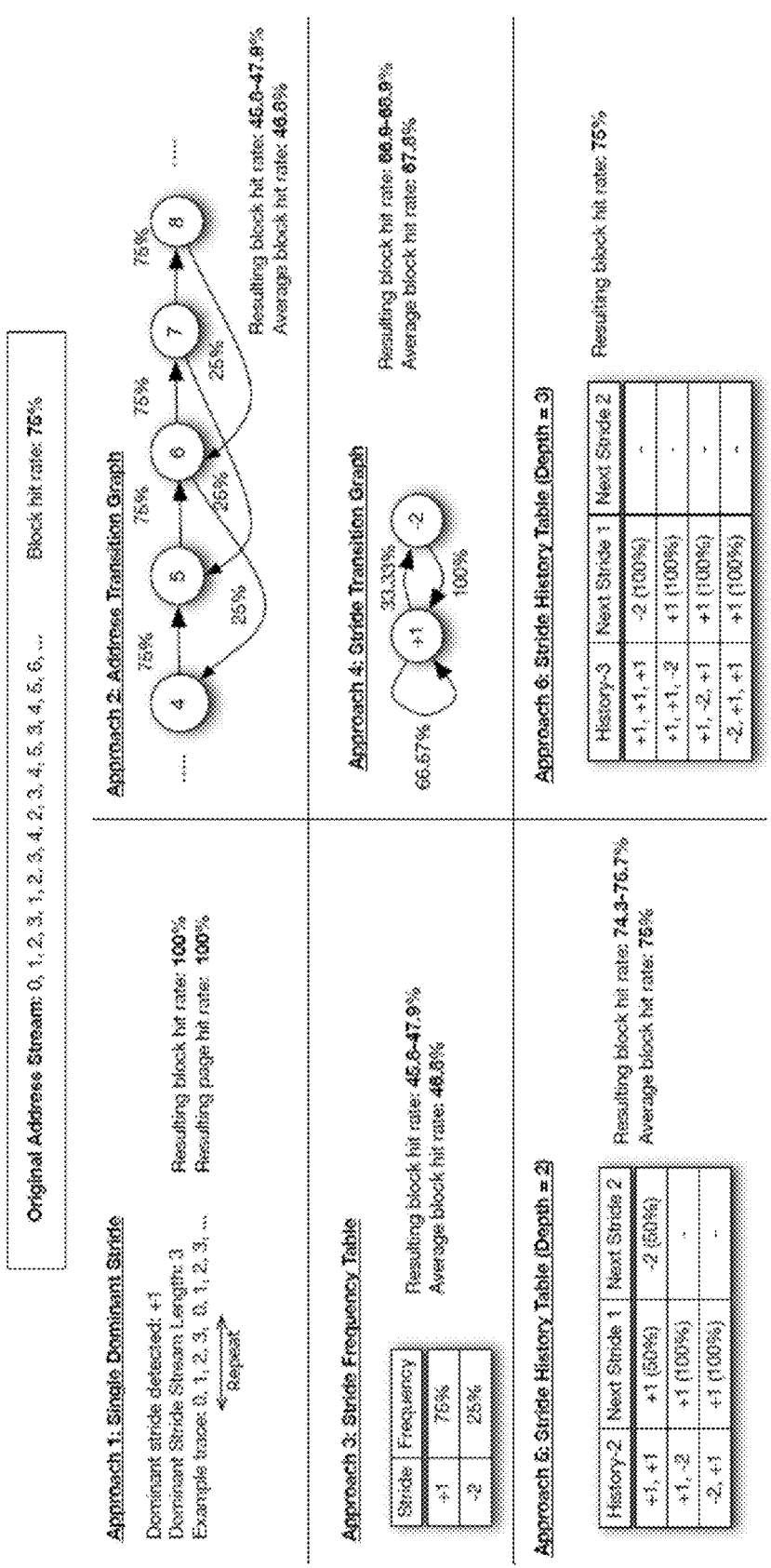
FIG. 11 depicts example approaches for modeling memory access behavior in accordance with embodiments of the present disclosure.

FIG. 11 depicts example approaches for modeling memory access behavior in accordance with embodiments of the present disclosure. The following example memory access pattern at a cache block level was used: 0, 1, 2, 3, 1, 2, 3, 4, 2, 3, 4, 5, 3, 4, 5, 6, . . . , as shown in FIG. 11 at the top box. The access pattern shows a simple block address stream, containing both spatial and temporal locality behavior. For simplicity, it is assumed that the cache is fully-associative with size of 4 cache blocks and it uses Least Recently Used (LRU) replacement policy. Therefore, the access pattern can cause the cache to miss once per 4 accesses on average; because the address pattern introduces new cache block after each 3 hits on the cache, generating a hit rate of 75% for a trace length of 100,000 accesses. Several approaches to model the memory access pattern are now considered, and the goal is to generate 100,000 accesses that match the original hit rate of the cache.

In the first approach shown in FIG. 11, the single dominant stride was considered. The stride +1 appears much more often than the stride −2. Thus, the stride +1 is the dominant stride with an average stream length of 3. When 100,000 accesses with stride +1 are generated, a trace of 0, 1, 2, 3, 0, 1, 2, 3, . . . is obtained. This trace causes a cache hit rate of near 100%, which is inaccurate, despite the fact that stride +1 is the most dominant stride by a wide margin vs. the stride −2. Thus, more than one stride value should be obtained.

In the second approach shown in FIG. 11, an address transition graph was used, where each block address was recorded as a node in a graph, and each edge in the graph connects a block address with its successor, and its transition probability. The space requirement to store this graph is very high, because there are a lot of distinct addresses in the virtual address space. For a 52-bit address space, if we keep a successor matrix, it requires up to $2^{52} \times 2^{52} = 2^{104}$ entries. To test the statistics, 100,000 Monte Carlo simulations were run to stochastically generate 100,000-length traces. The measured cache hit rates of the stochastic traces range from 45.8 to 47.9%, with an average of 46.8%. The resulting cache block hit rate is quite far from the hit rate of the original stream accesses, indicating its inability to capture the essential spatial/temporal behavior of the original trace.

In the third approach, strides were recorded instead of block addresses. Strides are often repeated much more than addresses, hence they result in very compact statistics. In the approach, the stride occurrence frequency were recorded on a table, thus the table records that stride +1 occurs with a 75% probability but stride −2 occurs with a 25% probability. To test the approach, an address trace was stochastically generated using the stride frequency table as a guide: if a generated random number 2 [0; 1]<0:75, then we generate a stride +1, otherwise we generate a stride of −2. There is no guarantee that strides +1 and −2 may be interleaved in the same order as in the original workload, but over 100,000 Monte Carlo simulations, the measured cache hit rates range from 45.8 and 47.9%, with an average of 46.8%.

In the fourth approach, stride transitions were recorded, rather than stride frequency, in a Markov Chain. For example, a stride −2 is always followed in the original address stream by a stride +1, which means there is a 100% probability for the edge going from node −2 to node +1. Monte Carlo simulations show across 100,000 different traces, the cache hit rates range from 66.9% to 68.9%, with an average of 67.8%. While the stride transition graph approach does not yield quite accurate results yet, it opens up a new family of related approaches, which lead us to the fifth and sixth approaches.

In the fifth approach, the next stride probability is recorded not on the current stride value, but on a history of the last M values. This is referred to herein as the stride history or stride pattern approach. The fourth approach may be referenced as a stride pattern approach with history depth of 1. The figure shows a history depth of 2 and 3. With a history depth of 2, Monte Carlo simulation shows traces achieving cache hit rates of 74.3-75.7% and 75.0% on average. The results are much closer to the original cache hit rate. For the history depth of 3, the cache hit rate is exactly 75.0%, matching the original block hit rate. Overall, modeling the spatial locality behavior can be challenging because fundamentally a lossy information compression problem is being handled. The stride pattern approach can be utilized in capturing spatial locality behavior, and consequently temporal locality as well. Despite the simplistic example, it can be observed from the figure a general trend that with the stride pattern approach, as the history depth increases, accuracy increases as well. Therefore, the stride pattern approach can be adopted as a foundation for STM.

In experiments, it was shown that a combination of stack distance profile and stride pattern table works well and better than the stride pattern table alone. FIG. 12 illustrates a diagram of example profiling structures in accordance with embodiments of the present disclosure. Referring to the left side of FIG. 12, a Stack Distance Probability (SDP) table is provides that shows the probability of accessing the most recently used entry (stack position 0), second most recently used entry (stack position 1), and all other stack positions. As an example, the probability for stack position 0, 1, and all others for the first set are 60%, 10%, and 30%, respectively. On the right is a Stride Pattern Probability (SPP) table showing what possible stride values (and their probabilities) follow a specific past stride pattern. This table is familiar, as it was referenced in FIG. 11. M represents the depth of the stride history pattern, (Z0; F0) denote the first stride value and probability for the specific stride history pattern, (Z1; F1) denote the second stride value and probability for the specific stride history pattern, etc.

Table 1 below summarizes the symbols that are used for discussion and their meanings.

TABLE 1

| Symbol | Meaning |
| --- | --- |
| $SDC_{ij}$ | Stack distance count table, keeping a count of accesses at row i and column j |
| $SDP_{ij}$ | Stack distance probability table, keeping probability of accessing column j over any columns in row i |
| $N_{rows}$ | Number of rows in the stack distance profile |
| $N_{cols}$ | Number of columns in the stack distance profile |
| $SPC_{S_N,\ldots,S_1|Z_k}$ | Stride pattern count table, keeping counts of transitions from past stride $S_N,\ldots,S_1$ to next stride $Z_k$ |
| $SPP_{S_N,\ldots,S_1|Z_k}$ | Stride pattern probability table, keeping the probability of transitioning from past stride $S_N,\ldots,S_1$ to next stride $Z_k$ over any values of k |
| M | Number of the most recent stride values in the stride pattern |
| $N_{succ}$ | Number of possible successor strides |
| $f_{SD}$ | Fraction of accesses that update the SD tables |
| $f_{wr}$ | Fraction of accesses that are writes |

Both Stack Distance (SD) and Stride Pattern (SP) profiles are gathered. The "C" or "P" suffix are added to them to distinguish a count statistics versus a probability statistics. SD profiles are kept in a table with Nrows rows and Ncols columns. The SP profiles are kept in a table, each entry is hash indexed using a stride pattern of the lastM stride values, and keepsNsucc possible successor stride values. During profiling, the SD tables are updated by keeping the tags of blocks that are most recently used, depending on the number of rows and columns of the SD tables. When there is a new address that is accessed, the address is first compared against tags in the SD tables. If there is a tag match, then the appropriate entry in the SD tables is updated appropriately, i.e. SDCij is incremented and SDPij is adjusted accordingly. If there is no tag match, the SP tables are updated, as illustrated in FIG. 12, which depicts a diagram showing how SPP is used during profiling and trace clone generation in accordance with embodiments of the present disclosure. The history of the last M stride value is kept (Step 1), and is given to a hash function to index the SP tables (Step 2) to access the appropriate entry in the tables. For the new address that is accessed, the new stride value is calculated by subtracting the address of the new access with the last access. It is then compared against one of the successor stride values in the tables (Step 3) to see if there is a match. If there is a match, the appropriate entry is updated by incrementing the matching stride count in the SPC table and adjusting the probability number in the SPP table. If there is no match, a new successor stride is entered into the table, and the count and probability are updated.

We also collect other statistics during profiling. First, we track the fraction of accesses that update the SD tables (and not the SP tables) is denoted as fSD (Table 1). We also collect the number of writes (or accesses due to store instructions) in order to obtain the probability of an access to be a read or a write. There are several reasons why we keep both the SD and SP profiles. First, it was found empirically that it is more accurate to keep both profiles as opposed to just the SP profiles, for a given stride pattern history depth. The SP profiles in general can be made more accurate by increasing its stride pattern history depth, but the SD profile adds accuracy without requiring a large increase in the history depth of the SP profile. The SD profiles have actually been proven to contain sufficient information for obtaining cache miss rates for different cache sizes assuming a fully/set associative cache with LRU replacement policy. Second, since the SD profile is incapable of capturing spatial locality, we use it only for very tight reuse distance. A prefetcher often works by detecting spatial locality pattern hence the L1 cache miss stream must contain an accurate spatial locality pattern for the prefetcher to be effective, hence we rely on the SP profile to capture any access patterns beyond ones with very tight reuse distance. Finally, the profile size is reduced significantly due to the SD profile acting as a filter to the SP profile.

An example STM clone generation procedure is now described. SP tables were maintained with the same configurations as used for profiling. The first step in generation is adjustment or scaling. The user starts out by determining the number of memory references desired for the clone. Suppose that the original number of memory references is Norig and the desired number of memory references in the clone is Nnew. All the SDC and SPC tables' content were adjusted by multiplying each element in the tables with the scaling ratio Nnew Norig. Note, however, that due to the Law of Large Numbers, there is a limit to scaling that beyond a certain point, the stochastic trace may be incapable of replicating the behavior of the original memory access behavior. The effect of scaling is evaluated below. The next step in the clone generation is to choose whether to use the SD or SP profile. To do this, a random number is generated $\rho_1 \epsilon [0, 1]$. If $\rho_1 < f_{SD}$, the next access may be generated using the SD tables, otherwise the SP tables. If it is decided that the access is a read or a write by generating a random number $\rho_2 \epsilon [0, 1]$. If $\rho_2 < f_{wr}$, a write is generated, otherwise a read. Subsequently, another random number $\rho_3$ is generated to select a row i in the SD table, and another random number $\rho_4$ to select a column j in the selected SD table row, all according to the statistical distribution in SDPij relative to other rows and columns in the selected row. The tag found in the ith row and jth column is the address assigned to the new access. After that, the SD tables are updated.

If $\rho_1 \leq f_{SD}$, the next access is generated using the SP tables, as illustrated in FIG. 12, which depicts a diagram of an example of how SPP is used during profiling and trace clone generation. To do this, the last M strides in the stride pattern history are used: $S_M, \ldots, S_1$ (Step A in the figure). The stride pattern history is then used to index the SPP through a hashing function and pattern tag matching (Step B). If the appropriate entry is found, then another random number $\rho_5$ is generated that picks a successor stride value $Z_k$ based on the probability distribution of all successor values in the entry (Step C). The $SPC_{SM, \ldots, S1}, Z_k$ is then decremented by one and $SPP_{SM, \ldots, S1}|Z_u$ for u=1, \ldots, $N_{succ}$ are recalculated. Then, the stochastically generated new stride value is left shifted into the stride pattern history (Step D).

The reason for decrementing the SPC and recalculating the SPP is to force strict convergence, where the actual stride pattern probability distribution can exactly match the original memory access' stride patterns at the end of clone generation. Strict convergence allows the trace clone to converge faster and more reliably to the original behavior compared to loose convergence. This is analogous to picking a ball from a bin that has N balls of different colors, without returning the picked ball. After N picks, the distribution of colors of the picked balls exactly matches the actual distribution of colors in the bin prior to picking. Loose convergence is analogous to picking a ball from the bin and then returning it to the bin, after each pick. Picked balls from loose convergence have a distribution that may not exactly match the original color distribution in the bin, and requires a lot more pickings to get a close match.

The final few steps (not shown in the figure) include generating a random number to select a write versus read access, updating the SP tables to reflect the new count and probability of the new stride, calculating the new address by adding the last access address to the new stride, and updating the SD tables to reflect a new address being accessed.

This process is repeated until Nnew accesses have been generated or until relevant entries in the SP tables are exhausted.

Finally, in case the desired output is an executable clone, STM automatically generates a C++ code which contains the memory references in the trace file. A large memory space (1 Gbyte) may be allocated to ensure that all of the references are accessing that range. The memory references themselves are inlined x86-64 assembly statements, each contains move instruction from the intended address to (or from) a special register if read (or written), respectively.

The clone generation can be implemented in a way to consider execution phases of a program. The reason for this is that it is possible for some applications to dramatically change their spatial locality behavior as they transition from one execution phase to another. For example, during a high spatial locality phase, a prefetcher may be very effective in eliminating cache misses, but during a low spatial locality phase, a prefetcher may not be very effective. Such dramatic changes may affect the prefetcher's ability to eliminate cache misses, and may result in the trace generated by the clone to be less accurate. For example, a long period of moderately effective prefetching may not eliminate the same number of cache misses as a period of very effective prefetching followed by a period of ineffective prefetching). To achieve that, we modify the profiling phase by having an independent stride behavior profile per fixed time interval period. In the generation phase, we use the same steps shown in the generation phase, but using the appropriate SP profile depending on the corresponding interval period.

For profiling and validation, we use gem5, a full system simulator, to run 27 SPEC CPU2006 benchmarks (all except wrf and tonto due to compilation issues) with the reference input. Each benchmark is fast forwarded for 10 billion instructions, and then the execution of the next 400 million instructions are profiled. Note that STM only receives statistical profiles as input, independent of the execution length. 400 million instructions are chosen only to keep the simulation runs needed for validation manageable. The system configuration used for collecting the profiles is as shown in Table 2 below. For evaluation and testing, we use a validated trace-driven multi-level cache simulator. The simulator is validated by comparing its miss rates with the standard cache module provided with gem5 simulator. The benchmarks are profiled using the SD tables with 128 rows and 2 columns. A periodic interval size of 100,000 memory references are used. A stride pattern history depth of 80 was used, and cache block size of 64 Bytes was used. For the TLB validation, since the TLB architecture is typically fully-associative, an SD profile of 1 row with 16 columns was used, and 4 KB page size. For both studies, the clones are set to generate 200 million memory references.

TABLE 2

| Component | Configuration |
| --- | --- |
| CPU | x86-64 processor, atomic mode, 2 GHz |
| L1 Cache | 64 B blocks, 32 KB size, 2-way, LRU |
| L2 Cache | 64 B blocks, 512 KB size, 8-way, LRU |
| Main memory | 2 GB |
| OS | Linux, Gentoo release 1.12.11.1 |

Now, validation of STM for accuracy is described for predicting various metrics, including the L1 cache miss rate, L2 cache miss rate, and TLB miss rate. For the validation, almost 400 different configurations per benchmark are used, while only one of the configuration (shown in Table 2) was used to gather the statistical profiles. For the configurations, the L1 and L2 cache parameters were varied, a prefetcher of various configurations was added, and the TLB and page sizes were varied. Two metrics were used for validation: rank accuracy and correlation coefficient/factor. Correlation factor is a measure of how two sets of data related in term of trends, ranging from −1 (negatively related) to 1 (positively related). One weakness of correlation factor is that it does not indicate how high is good enough. Another weakness is that magnitudes are not necessarily captured well, for example a data series that is scaled by a constant from another data series have a correlation value of 1.0, despite the difference in magnitudes. In design search exploration, computer architects care greatly about relative performance ranking, i.e. the result of comparing one configuration versus another, to see which configuration achieves better performance (e.g. lower miss rate). Thus, one of the most important criteria for clone accuracy is whether the substitution of the original workloads with the clones yield the same or different relative performance ranking. To achieve that, for each pair of different cache/prefetcher/TLB configurations, we compare the appropriate L1/L2/TLB miss rates. If the absolute difference in the miss rate is less than 0.1%, we categorize the relative performance ranking as indistinguishable. If the first configuration achieves a lower miss rate by at least 0.1%, then the first configuration is categorized as better in relative performance compared to the second configuration. Otherwise, it is categorized as worse in relative performance.

Next, the outcome category from the original workload versus the outcome category from the clone is compared. If they agree, a rank accuracy counter is incremented. Rank accuracy is defined as a ratio of the rank accuracy counter and the total number of pairs. Rank accuracy captures differences in magnitudes, especially with a large number of data points.

Each set of validation results are discussed. First, STM is compared against a standard approach and single dominant stride (SDS) approaches. The L1 cache configuration was fixed at 16 KB size, 2-way associativity, and 64-byte block size. The L1 cache was augmented with a stream buffer prefetcher. The stream buffers were varied by varying the number of stream buffers from 1; 2; 4; 8; : : : ; 256, and varying each stream buffer depth from 1; 2; 4; 8; . . . ; 256. A configuration is included where no prefetcher is used. This results in 82 configurations per benchmark, and 2,214 validation points overall. This case is perhaps the most important test for the ability of STM to capture the spatial locality behavior of memory accesses.

Figure 13:
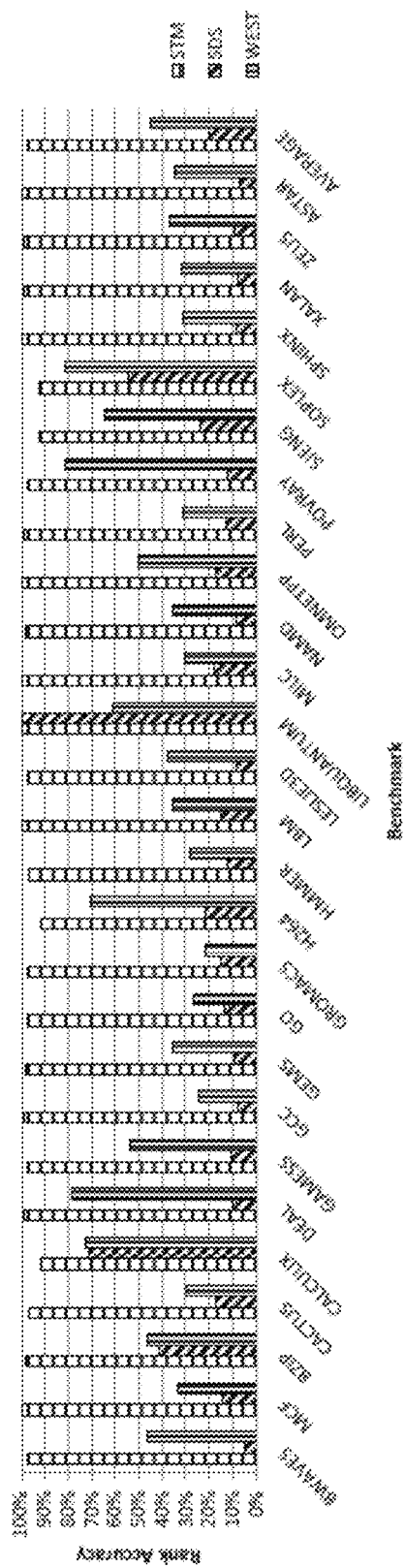
FIG. 13 is a graph showing a rank accuracy comparison between STM, a known technique, and SDS across L1 prefetcher configuration.

The result for the rank accuracy is shown in FIG. 13, for all benchmarks and the average of all benchmarks. FIG. 13 is a graph showing a rank accuracy comparison between STM, a known technique, and SDS across L1 prefetcher configuration. Particularly, FIG. 13 shows that on average, the rank accuracies for STM, West, and SDS are 97.5%, 44.8%, and 20.5%, respectively. Despite attempting to capture spatial locality behavior, SDS is unable to replicate the spatial behavior of the original workload. STM is able to achieve a very high average rank accuracy, and consistently across benchmarks where STM strictly outperforms the known technique and SDS. This result shows that STM is able to capture spatial locality much better than the known technique and SDS.

In this section, we vary the L1 cache and L1 prefetcher configurations simultaneously. As in Section 5.1, for each cache size, we vary the prefetcher's number of stream buffers from 1; 2; 4; 8; : : : , 256, and vary each stream buffer depth from 1; 2; 4; 8; : : : ; 256. For the L1 cache, we use three size/associativity configurations: 16 KB/2-way, 32 KB/4-way, and 64 KB/8-way. This results in 246 configurations per benchmark, or 6,642 data points overall.

Figure 14:
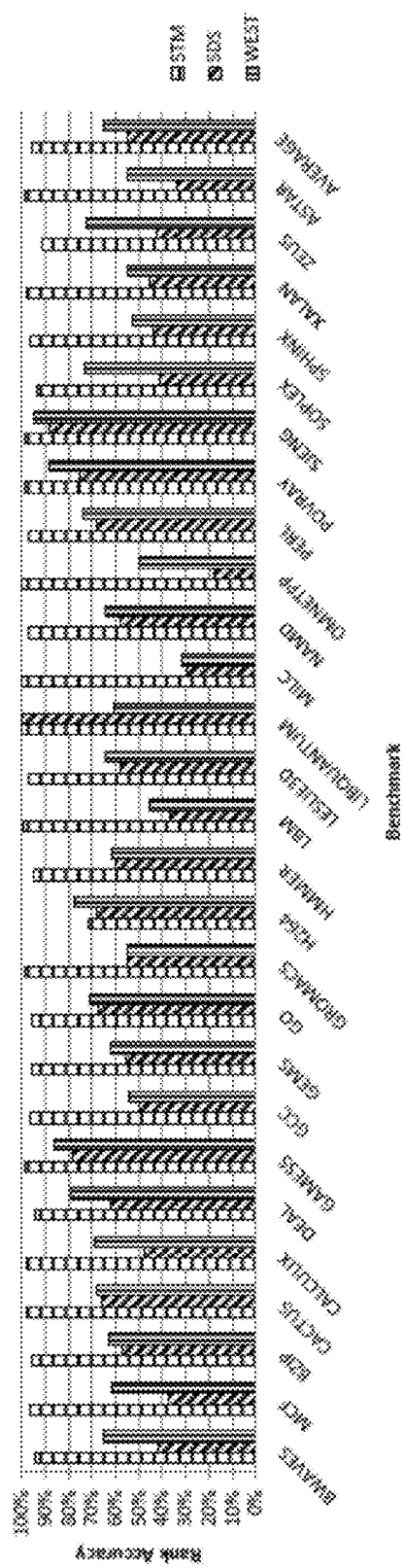
FIG. 14 is a graph showing rank accuracy comparison between STM, a known technique, and SDS across L1 configurations.
Figure 15:
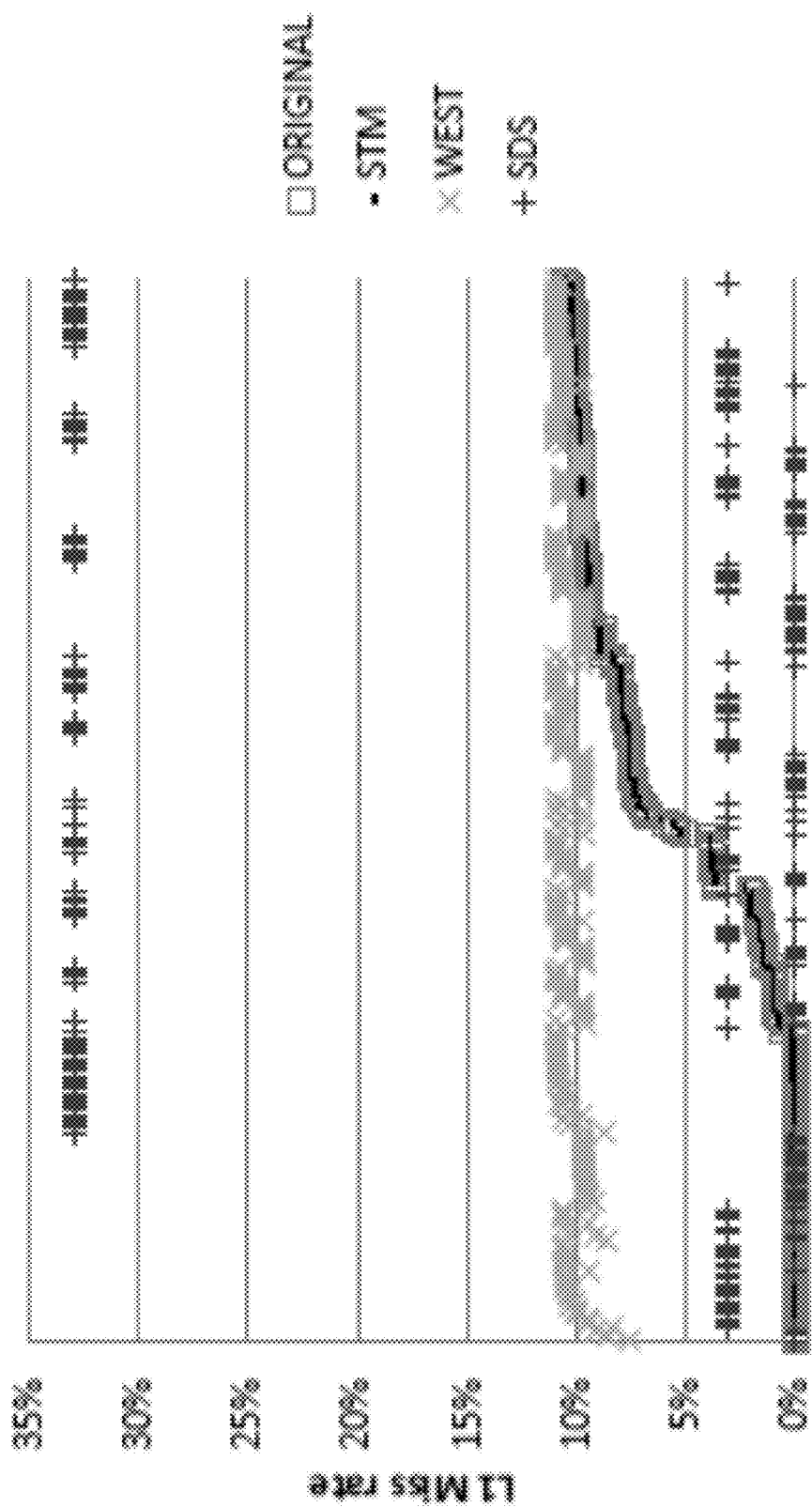
FIG. 15 is a plot showing STM versus the known technique and SDS.

FIG. 14 is a graph showing rank accuracy comparison between STM, a known technique, and SDS across L1 configurations. Particularly, FIG. 14 shows the rank accuracy of STM, Single Dominant Stride (SDS), and the known technique in the measure of L1 cache miss rate, across benchmarks and on average. The average rank accuracies for STM, the known technique, and SDS are 96.0%, 65.0%, and 54.9%, respectively. STM consistently achieves a higher rank accuracy than SDS, as well as the known technique (except for h264 where STM's rank accuracy is slightly worse). The known technique's result is contributed by its relatively high rank accuracy due to capturing the temporal locality across L1 cache configurations, but not across prefetcher configurations. On the other hand, STM's result is contributed by h264's very long stride patterns that are not sufficiently captured with the history depth of 80. Increasing the history depth from 80 to 100 and 120 result in a substantial accuracy improvement but at the expense of larger SP tables. Therefore, it slightly achieves better rank accuracy than STM. The average correlation coefficients follow a similar trend, they are 99.5%, 62.1%, and 47.4% for STM, the known technique, and SDS, respectively. SDS achieves a negative correlation coefficient for some benchmarks, while STM achieves >96% correlation across all benchmarks. The average and maximum absolute error for STM is 0.17% and 1.6%. The difference in L1 miss rates generated by STM versus the known technique and SDS on one benchmark (lbm) is zoomed in through a miss rate map in FIG. 15, which illustrates a plot showing STM versus the known technique and SDS (original versus clone L1 miss rates). FIG. 15 plots all 246 points in the increasing order of original L1 cache miss rates, and overlay the clones' L1 miss rates on top of them for the corresponding data points. The figure shows that the L1 miss rates generated by the known technique and SDS clones are uncorrelated with the original L1 miss rates. In the case of the known technique, the clone's miss rates stay almost constant at 10%. In the case of SDS, the clone's miss rates are clustered in three values: near 0%, near 3%, and near 33%. In contrast, STM achieves miss rates are largely indistinguishable with the original L1 miss rates. This confirms that the spatial locality behavior cannot be captured by neither the known technique's stack distance profile nor SDS's dominant stride, and requires STM's stride pattern profile for capture.

Figure 16A:
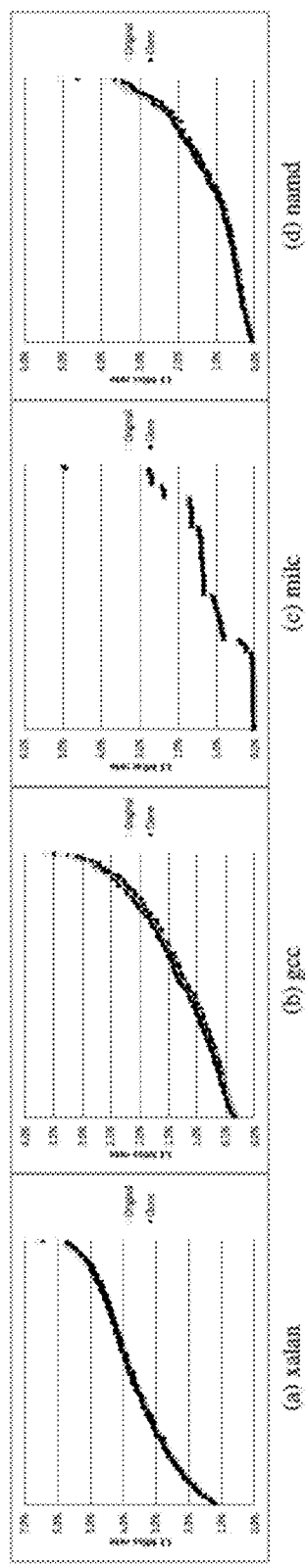
FIGS. 16A-16C show the miss rate maps (a)-(l) for 12 representative benchmarks for STM.
Figure 16B:
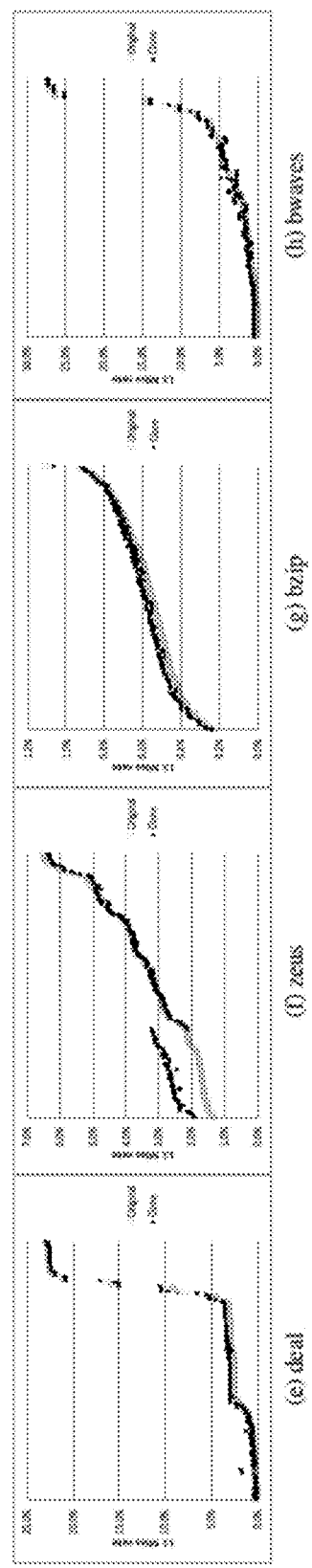
Figure 16C:
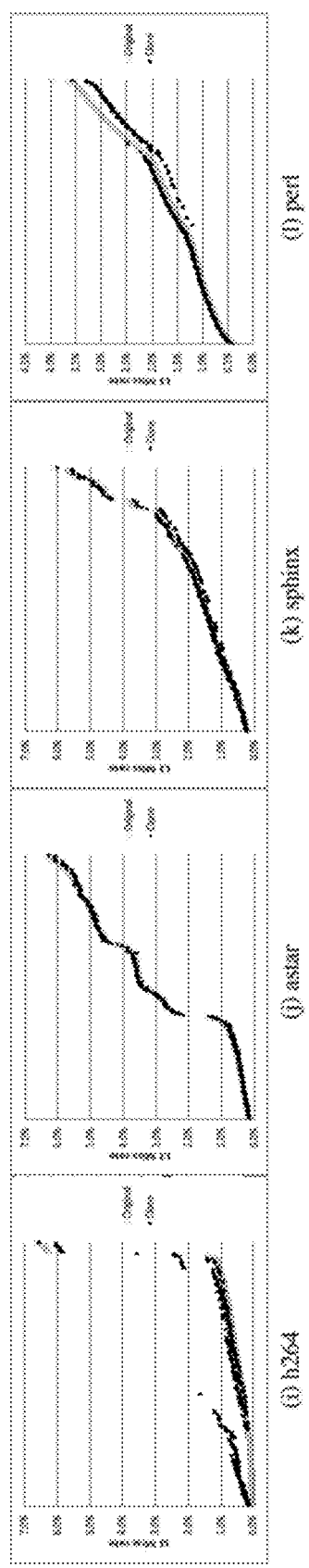

To get a better insight, FIGS. 16A-16C show the miss rate maps (a)-(l) for 12 representative benchmarks for STM. The benchmarks were sorted based on STM's rank accuracy and choose six highest and six lowest benchmarks. Two benchmarks showing the worst rank accuracies are zeus and h264.

The figure shows that apart from zeus and h264, the clones' L1 miss rates are very close compared to original benchmarks' L1 miss rates. For zeus and h264, there is a systematic error affecting data points with low L1 miss rates. It was noted herein about h264's very long stride pattern that is insufficiently captured with history depth of M=80. For zeus, increasing the history depth does not improve the rank accuracy. It may be that zeus clone's systematic error comes from our statistics not capturing spatial locality within blocks, which are interleaved with spatial locality across blocks.

Figure 17:
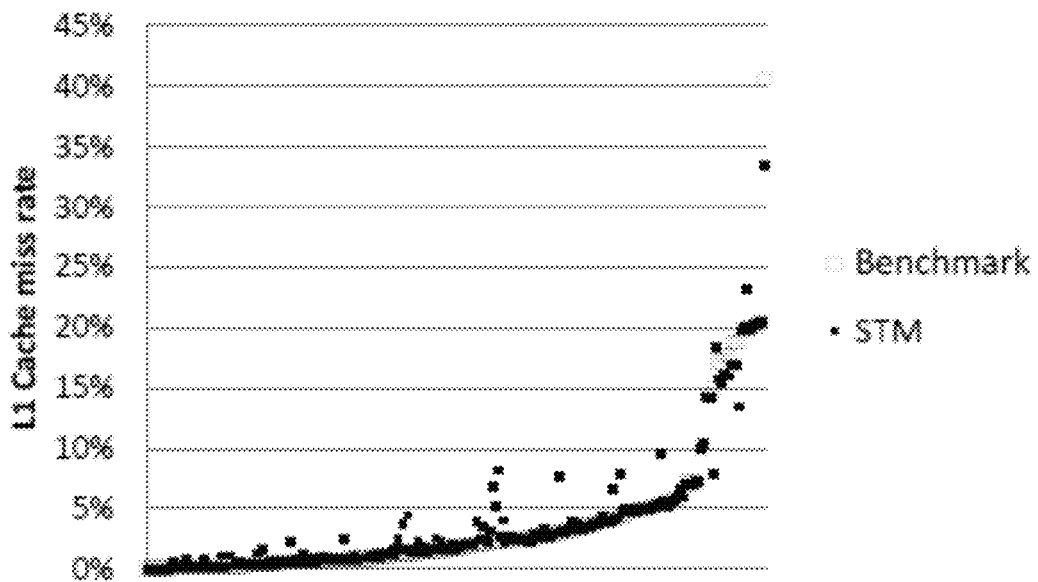
FIG. 17 is a graph depicting the impact of changing the L1 cache block size.
Figure 18:
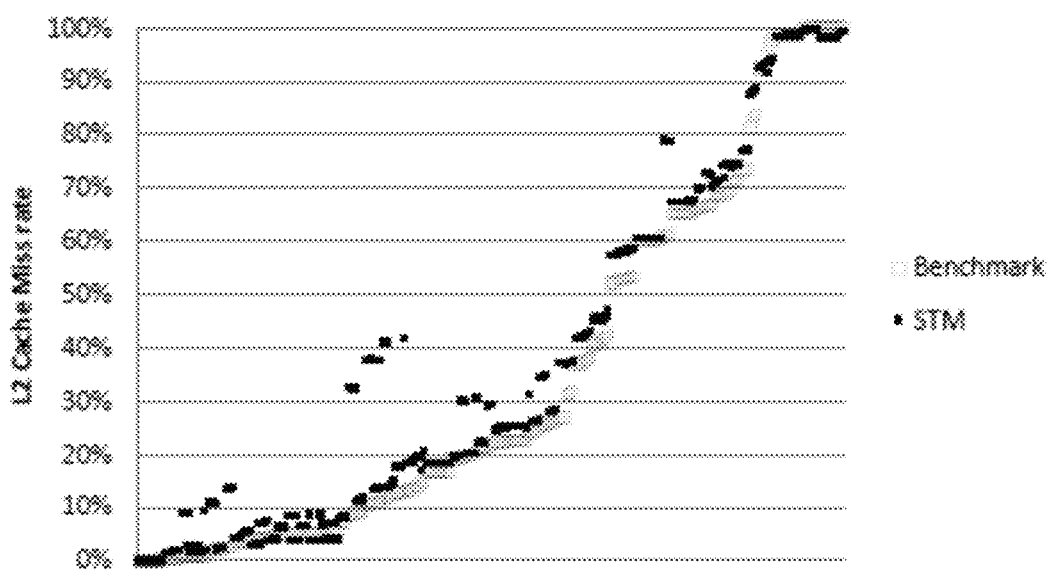
FIG. 18 is a graph comparing the L2 miss rate for various L2 cache configurations.

The impact of changing the L1 cache block size from 64B (default), 128B and 256B, while also varying the size/associativity (32 KB/4-way, 64 KB/8-way, and 128 KB/16-way), and plo the sorted original L1 miss rates for all data points of all benchmarks, and overlay the corresponding clones' L1 miss rates in FIG. 17, which illustrates a graph depicting the impact of changing the L1 cache block size. This case is important test because increasing the block size turns spatial locality across neighboring blocks into temporal locality. The figure shows a close fit in general (with a small number of outliers), with the average absolute miss rate error of 0.4%, average rank accuracy of 89.1%, and correlation coefficient of 98.0%. 5.4 L2 Cache Configurations. The L2 cache sizes are varied from 256 KB, 512 KB to 1 MB, and for each size vary the associativity from 4, 8, 16, to 32, while fixing the L1 cache at 16 KB/2-way, and plot the sorted original L2 miss rates for all data points of all benchmarks, and overlay the corresponding clones' L2 miss rates in FIG. 18, which illustrates a graph comparing the L2 miss rate for various L2 cache configurations. The L2 cache is non-inclusive. The L1 cache uses a write-through policy. Both L1 and L2 caches use a 64-byte block size. Referring to FIG. 18, the figure shows a relatively close match the L2 cache miss rate for the original benchmarks under different L2 cache configurations. The average rank accuracy is 88.8%, correlation coefficient is 98.5%, and the average absolute L2 miss rate error is 4.0%. The error is generally higher than L1 miss rate statistics because L2 misses are accesses that have already been filtered by the L1 and the L2 cache, hence inaccuracies have compounded at the L1 and L2 levels. However, the trends still match quite well, with the outliers contributed by just one benchmark: zeus. The experiments were repeated for write-back L1 caches, while keeping everything else unchanged. In such a case, the average rank accuracy, correlation coefficient, and absolute L2 miss error are 87.9%, 97.4%, and 5.9%. As with the write-through case, all benchmarks match well except for zeus which remains an outlier.

Another important test for STM is whether it can capture spatial locality at even larger granularities: the page size. The profiling is performed assuming a 4 KB page size, but the actual page size is varied from 4 KB, 8 KB, 16 KB, 32 KB, 64 KB, to 128 KB. For each page size, we also vary the fully associative TLB size from 16, 32, 64, to 128 entries. There are 24 configurations per benchmark, for a total of 648 data points, shown as sorted TLB miss rate in FIG. 19. The figure shows that a close fit: an average absolute TLB miss rate error of 0.06%, rank accuracy of 95.3%, and correlation coefficient of 99.8%. Here, the sensitivity of STM to its parameters is explored.

Figures 19, 20:
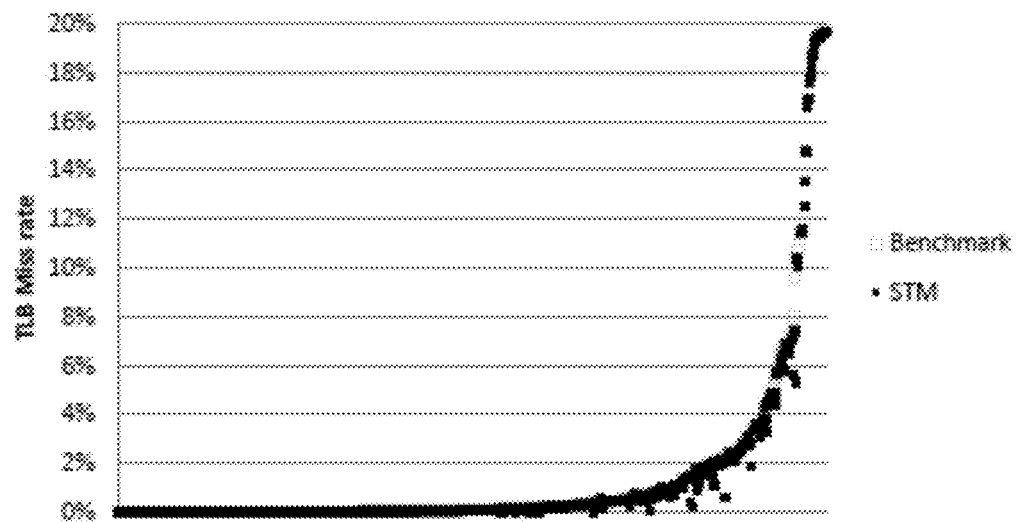
FIG. 19 are plots that shows that a close fit: an average absolute TLB miss rate error of 0.06%, rank accuracy of 95.3%, and correlation coefficient of 99.8%.
FIG. 20 is a graph showing the impact of varying the stride pattern history dept.

For all experiments, for each parameter that we vary, we include various L1 cache and prefetcher configurations. First, the stride pattern history depth was varied, from M=30 to M=100, and the correlation value is shown in FIG. 20, which illustrates a graph showing the impact of varying the stride pattern history dept. The figure confirms that the ability to capture spatial (and temporal) locality behavior increases with the history depth. Increasing the depth makes it possible to capture some stride patterns that are long. However, since there are few such long patterns, increasing the depth beyond M=80 shows a diminishing improvement.

Figure 21:
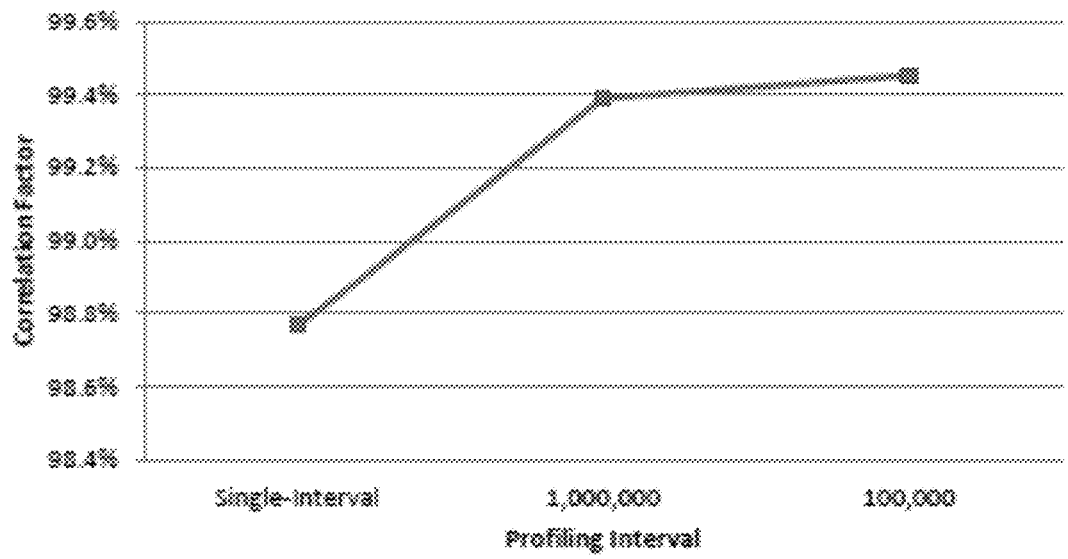
FIG. 21 is a graph showing the correlation coefficient values across different profiling intervals ranging from a single interval (for the entire execution), 1 million, and 100,000 memory references.

Second, we vary the profiling interval size to test our hypothesis that the change in execution phase may impact the overall ability of STM in capturing spatial and temporal locality behavior. FIG. 21 shows the correlation coefficient values across different profiling intervals ranging from a single interval (for the entire execution), 1 million, and 100,000 memory references. The figure confirms that as the interval size is reduced, the correlation coefficient increases, suggesting that STM works more accurately in capturing the memory access behavior when it profiles and models each interval separately from others. Such results are likely caused by different phases of the program exhibiting different memory access behavior. One drawback of having small profiling interval period is the increase in the profile size. Fortunately, it seems that at 100,000 memory references, the correlation coefficient levels off, thus we do not need to use smaller intervals.

Figure 22:
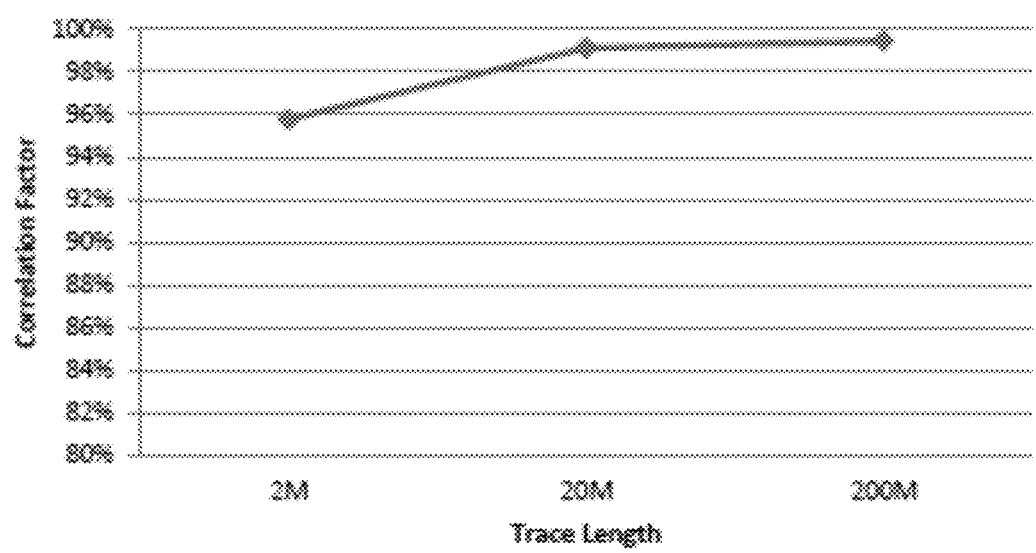
FIG. 22 is a graph showing the impact on correlation coefficient when we vary the number of clone memory references from 200 million to 20 million to 2 million.

Third, we vary the scaling ratio to test how small we can reduce the original number of references. Since STM relies on statistical convergence, if we have many small probability values to replicate, we need a relatively large number of accesses. For example, to replicate a probability value of 12.3456%, we need at least 1 million memory reference in the clone. Furthermore, the Law of Large Number requires a stochastic process to have a sufficiently large number of samples. Therefore, there is a limit on scaling down the number of memory references in the clone, however, the limit is likely in absolute number of references, and not relative to the original number of memory references. FIG. 22 shows the impact on correlation coefficient when we vary the number of clone memory references from 200 million to 20 million to 2 million. The figure shows that we do not lose accuracy with 20 million memory references. The scaling ratio depends on the original memory references, in our case the ratio is 110 but the ratio can be much lower if the original number of memory references is much higher.

In other embodiments, a framework for generating synthetic memory traffic for memory subsystem design exploration is provided. It is noted that the memory subsystem (memory controller, bus, and DRAM) is becoming a performance bottleneck in many computer systems. The continuing fast pace of growth in the number of cores on a die places an increasing demand for data bandwidth from the memory subsystem. In addition, the memory subsystem's share of power consumption is also increasing, partly due to the increased bandwidth demand, and partly due to scarce opportunities to enter a low power mode. Thus, optimizing the memory subsystem is becoming increasingly critical in achieving the performance and power goals of the multicore system.

Optimizing the design of the multicore processor's memory subsystem requires good understanding of the representative workload. Memory subsystem designers often rely on synthetically generated traces, or workload-derived traces (collected by a trace capture hardware) that are replayed. The trace may include a list of memory accesses, each identified by whether it is a read/write, address that is accessed, and the time the access occurs. Experiments with these traces lead to decisions about memory controller design (scheduling policy, queue size, etc.), memory bus design (clock frequency, width, etc.), and the DRAM-based main memory design (internal organization, interleaving, page policy, etc.).

The method of relying on traditional traces face two major challenges. First, many software users are apprehensive about sharing their code (source or binaries) due to the proprietary nature of the code or secrecy of data, so representative traces are sometimes not available. These users may include national laboratories, industrial research labs, banking and trading firms, etc. Even when a representative trace is available, there is another major challenge: the trace may not capture the complexity of the interaction between the processor and the memory subsystem. Specifically, there is a feedback loop where memory performance affects processor performance, which in turn alters the timing of memory requests that reach the bus. In a multicore system, the processor core (and cache) configuration and the application together determine the processor performance which affect the timing of memory requests that are received by the memory subsystem. The memory requests and the memory configuration together determine the memory performance. More importantly, the memory subsystem has a feedback loop with the core which affects the timing of future memory requests. The degree of the feedback loop affecting processor performance depends on events in the memory subsystem (e.g. row buffer hits, bank conflicts), the characteristics of the applications (e.g. a pointer chasing application is more latency sensitive than others), and the characteristics of the mix of applications co-scheduled together.

Figure 23A:
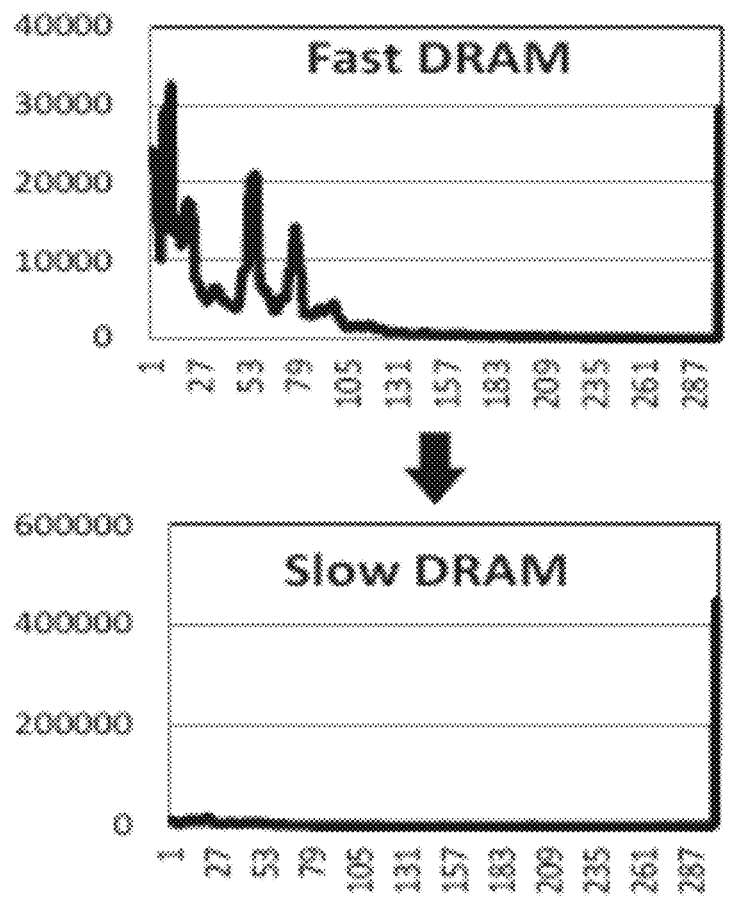
FIG. 23A is a graph showing the inter arrival timing distribution of SPEC 2006 benchmark bzip2 when running on a system with a DDR3 DRAM with 1.5 ns cycle time (i.e. 667 MHz) versus 12 ns cycle time.
Figure 23B:
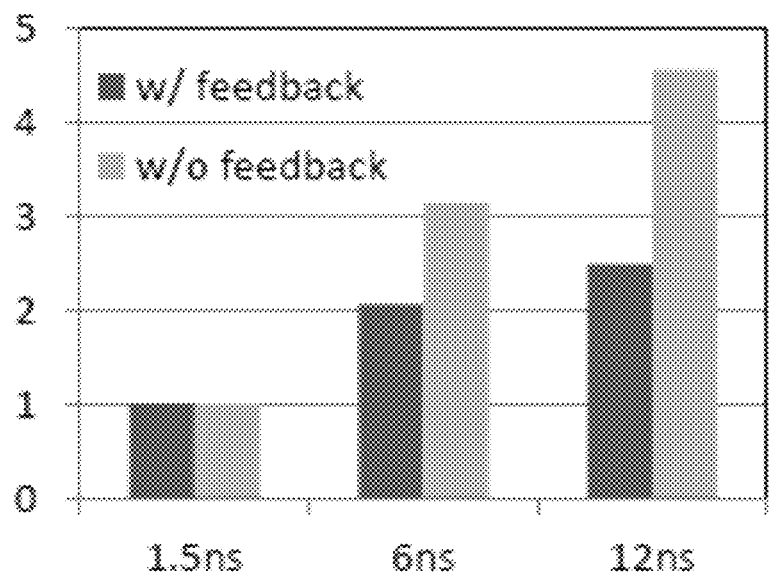
FIG. 23B shows DRAM power consumption when the DRAM cycle time is varied from 1.5 ns to 6 ns and 12 ns, normalized to the 1.5 ns case.

Due to this feedback loop, a conventional trace may be woefully inadequate for evaluating the memory subsystem design. To get an idea of the extent of the problem, FIG. 23A shows the inter arrival timing distribution of SPEC 2006 benchmark bzip2 when running on a system with a DDR3 DRAM with 1.5 ns cycle time (i.e. 667 MHz) versus 12 ns cycle time. The x-axes shows the inter-arrival timing gap between two consecutive memory bus requests, while the y-axes shows the number of occurrence of each gap. Notice that the inter-arrival distribution is highly dependent on DRAM speed. With a slow DRAM, the inter-arrival distribution shifts to the right significantly because the slow DRAM's feedback loop forces the processor speed to decline when instructions waiting for data from DRAM are blocked in the pipeline. If one uses the trace simulation, the feedback loop will be missing. FIG. 23B shows DRAM power consumption when the DRAM cycle time is varied from 1.5 ns to 6 ns and 12 ns, normalized to the 1.5 ns case. Traditional traces show increased DRAM power consumption as the cycle time increases, but severely under-estimate the power consumption when the feedback loop is accounted for. Other design aspects are also affected. For example, estimating the size of memory controller scheduling queue depends on how bursty requests may be, but burstiness in turn depends heavily on DRAM speed.

Figure 24A:
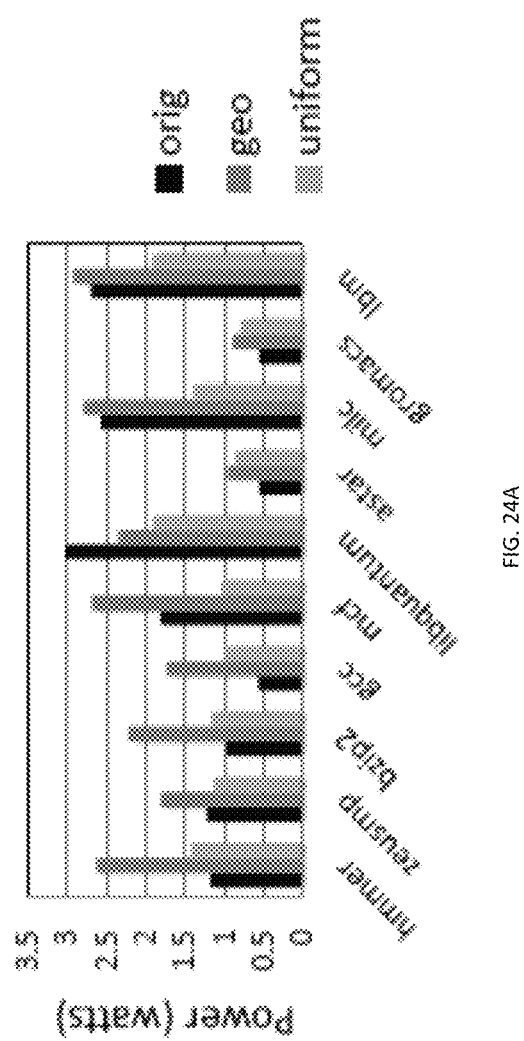
FIGS. 24A and 24B are graphs that show that uniform and geometric interarrival do not represent the original benchmarks' behavior well across most benchmarks.
Figure 24B:
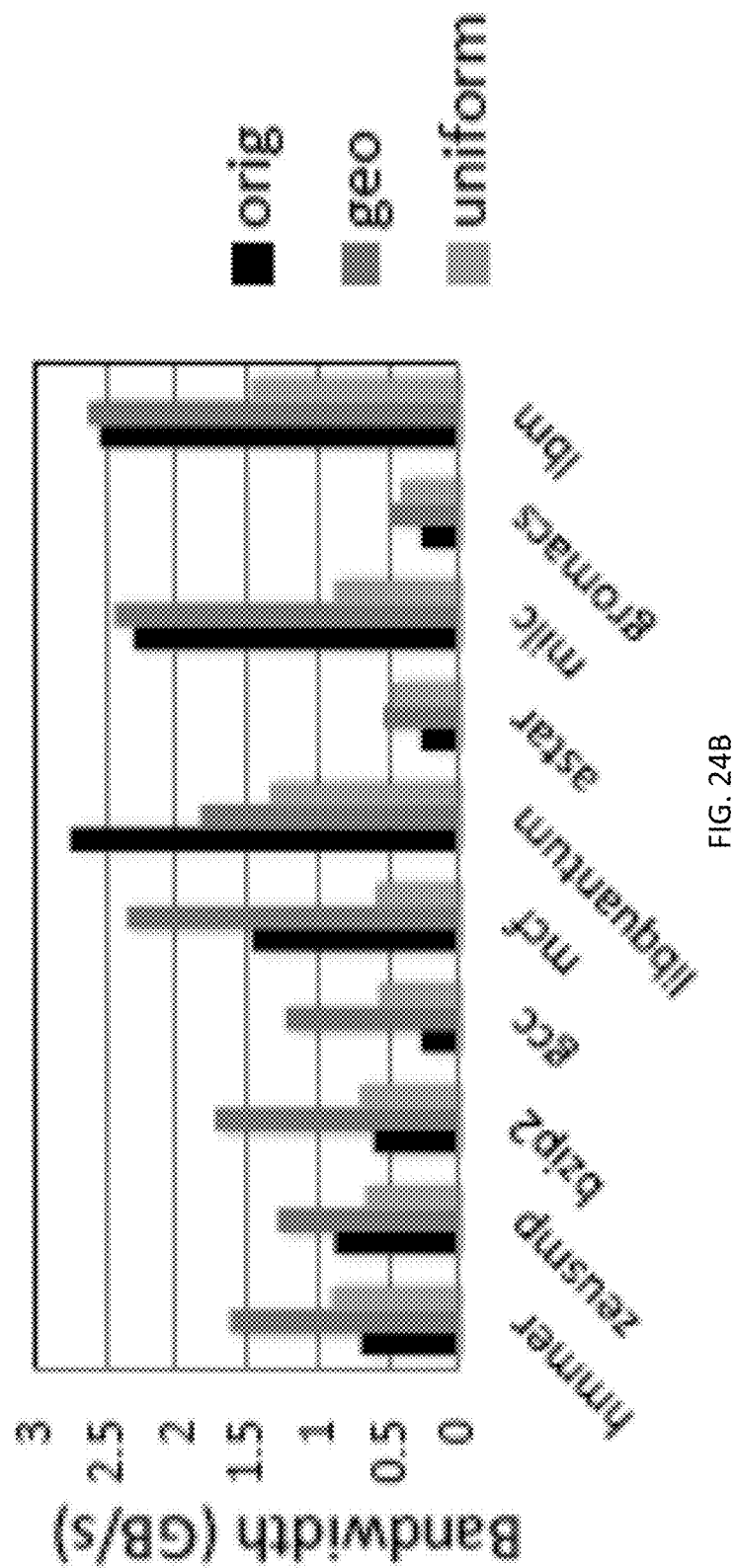

Note, however, that even with feedback loop being hypothetically accounted, the inter-arrival distribution still has to be modeled correctly. Many synthetically generated traces assume standard inter-arrival probability distributions, such as uniform or geometric. A uniform inter-arrival (not to be confused with constant interarrival) is one where the inter-arrival time values are randomly generated with equal probabilities. A geometric inter-arrival follows the outcome of a series of Bernoulli trials over time. A Bernoulli trial is one with either a successful outcome (e.g. whether a memory reference results in a Last Level Cache/LLC miss) or a failure. A series of Bernoulli trials result in a stream of LLC misses reaching the memory subsystem, with their inter-arrival time following a geometric distribution. A Bernoulli process can be viewed as the discrete-time version of Poisson arrival in the M/*/1 queuing model, which is widely used in modeling queuing performance. In experiments, traces where generated with uniform and geometric interarrival and compared against the original application in terms of DRAM power and bandwidth in FIGS. 24A and 24B, assuming 667 MHz DDR3 DRAM. FIGS. 24A and 24B show that uniform and geometric interarrival do not represent the original benchmarks' behavior well across most benchmarks. While not shown, similar mismatch was also observed on other metrics such as the average queue length of memory controller and the average bus queuing delay.

In accordance with embodiments of the present disclosure, systems and methods are provided for solving the proprietary and representativeness problems of memory traffic cloning. These techniques are referred to herein as "Memory Traffic Timing," "MeT2" or "MeToo." To solve the proprietary problem, a small set of statistics of the original application's memory behavior may be collected through profiling. The statistics may be used to generate a proxy application (or clone) that produces similar memory behavior. To ensure the representativeness of the timing of memory accesses, the method may generate instructions that form the clone binary such that the feedback loop is captured by injecting dependences between instructions. The clones can mimic the original application's timing behavior of memory traffic much better than uniform or geometric traffic patterns, and that they can capture the performance feedback loop well. The results are demonstrated for single applications running alone as well as co-scheduled applications running on a multicore platform, where MeToo achieved an average absolute error of only 4.2%.

Figure 25A:
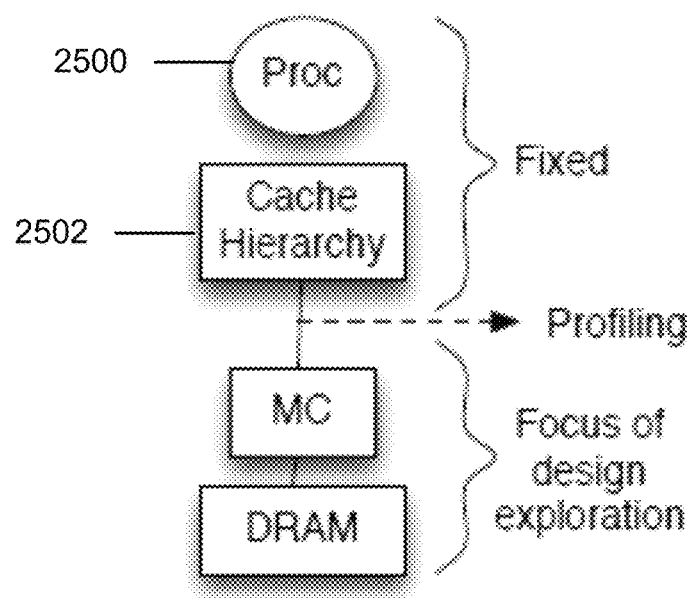
FIGS. 25A and 25B are diagrams depicting an example cloning framework in accordance with embodiments of the present disclosure.
Figure 25B:
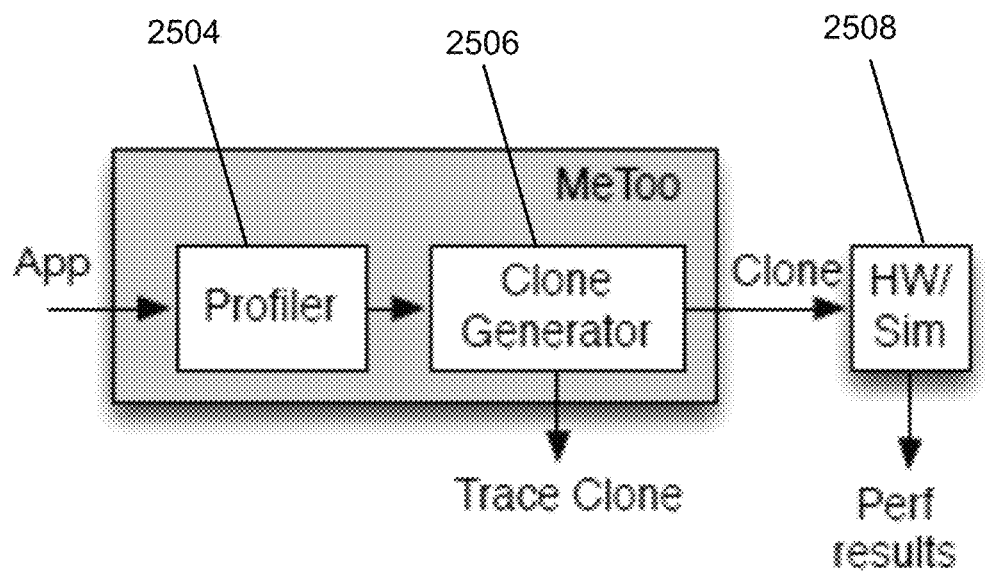

FIGS. 25A and 25B illustrate diagrams depicting an example cloning framework in accordance with embodiments of the present disclosure. In this example, the figure depicts MeToo's assumptions and framework. FIG. 25A shows that MeToo may be used for design exploration of the memory subsystem (memory controller, memory bus, and DRAM). The design of the processor and cache hierarchy may be assumed to have been determined and fixed. In other words, a single clone can be used for evaluating multiple memory subsystem configurations, but can only be used for one processor and cache configuration. Experimenting with different processor and cache hierarchy models is possible, but it requires profiling to be repeated for each different combination of processor and cache hierarchy configuration. Even so, a limited set of changes to the processor parameters were used in experiments, and it was found that the same clone can still be accurate and applicable over these processor configurations. A consequence of such an assumption is that the profile used in MeToo focuses on memory traffic generated past the Last Level Cache (LLC). This includes LLC misses (corresponding to read or write misses in a write back cache), write backs, and hardware-generated prefetch requests.

FIGS. 25A and 25B depict an example flow of the MeToo framework. First, an application is run on a processor 2500 and a cache hierarchy model 2502 and its profile is collected. A profiler 2504 may generate the profile and feed the profile to a clone generator 2506 which produces an executable clone that includes feedback loop sensitive timing information. The executable clone can be used to run on a full-system simulator or on real hardware 2508. Alternatively, a traditional trace can also be generated, but without the feedback loop mechanism.

Memory traffic depends on cache accesses at the LLC level. There are three ways an LLC produces memory requests (i.e. requests that reach the memory subsystem). First, a read or write that misses in the LLC will generate a read request to the memory subsystem, assuming the LLC is a write back and write allocate cache. Second, a block write back generates a write request to the memory subsystem. Finally, hardware prefetches generate read requests to the memory subsystem. Note that our MeToo clones must capture the traffic that correspond to all three types of requests but only one type of request is generated by execution of instructions on the processor. Thus, a MeToo clone may only include instructions that may be executed on the same processor model, yet a challenge is that it must capture and generate all three types of requests. A description of how MeToo can handle each type of request.

The first type of request MeToo must capture faithfully is memory traffic that results from loads/stores generated by the processor that produce read memory requests. To achieve that, the per-set stack distance profile is captured at the last level cache. Let Sij represent the percentage of accesses that occurs to the ith cache set and jth stack position, where the 0th stack position represents the most recently used stack position, 1st stack position represents the second most recently used stack position, etc. Let Si denote the percentage of accesses that occurs to the ith set, summed over all stack positions. These two statistics alone provide sufficient information to generate a synthetic memory trace that reproduces the first type of requests (read/write misses), assuming a stochastic clone generation is utilized. These are the only statistics that are similar to the ones used in West. All other statistics discussed from hereon may be unique to MeToo.

Figure 26:
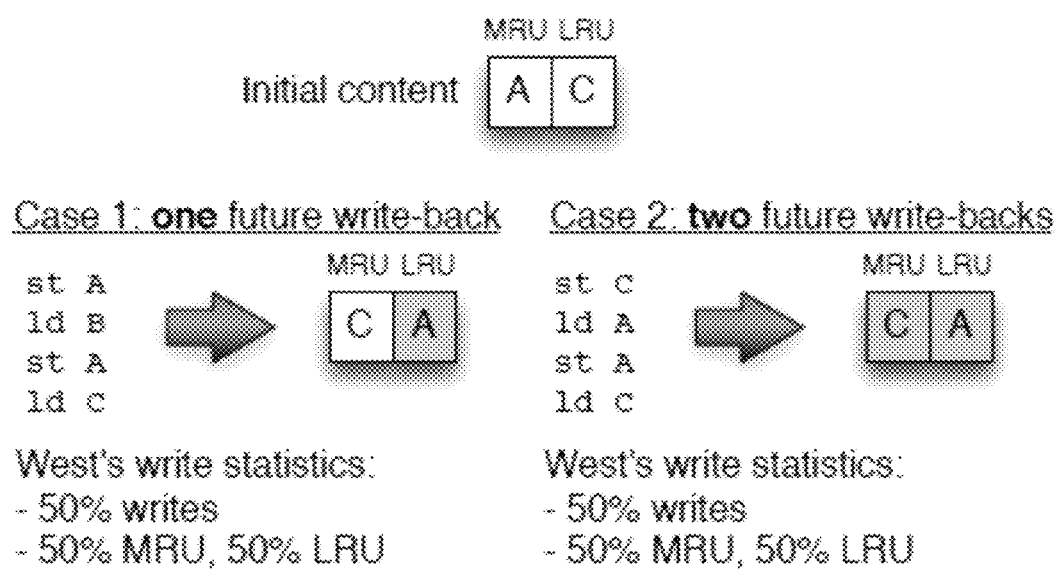
FIG. 26 shows two cases that are indistinguishable in the previous solution, but contribute to different number of write back.

To deal with the second type of memory requests (i.e., ones that occur due to LLC write backs), it was found that statistics previously generated are insufficient. For example, one solution captures the fraction of accesses that are writes in each set and stack distance position. However, the number of write backs is not determined by the fraction of accesses that are writes. Instead, it depends on the number of dirty blocks. The previous solution's write statistics does not capture the latter. To illustrate the difference, FIG. 26 shows two cases that are indistinguishable in the previous solution, but contribute to different number of write backs. The figure shows a two way cache set initially populated with clean blocks A and C. Case 1 and 2 show four different memory accesses that produce indistinguishable results in the previous solution's write statistics: 50% of the accesses are writes, half of the writes occur to the MRU block and the other half to the LRU block. In both cases, the final cache content includes block A and C. However, in Case 1, only one block is dirty, while in Case 2, both cached blocks are dirty. This results in a different number of eventual write backs. The difference in the two cases is simple: a store to a dirty block does not increase the number of future write backs, while a store to a clean block increases the number of future write backs. In order to distinguish the two cases, MeToo records $WC_{ij}$ and $WD_{ij}$, representing the probability of writes to clean and dirty blocks respectively, at the ith cache set and jth stack position.

In addition to this, the average dirty block ratio (fraction of all cache blocks that are dirty) fD and write ratio fW (fraction of all requests to the memory subsystem that are write backs) were recorded. The clone generator uses these two values to guide the generation of load and store for the clone. For example, the generator can generate more store instructions when the dirty block ratio is found to be too low during the generation process. The generator can try to converge to all these statistics during generation process.

The final type of requests is one due to hardware-generated prefetches. The LLC hardware prefetcher can contribute significantly to memory traffic. One option to deal with this is to ensure that the real or simulated hardware includes the same prefetcher as during profiling. However, such an option cannot capture or reproduce the timing of prefetch requests. Thus, a different approach was pursued, which is to gather p, the statistics of the percentage of traffic-generation instructions that trigger hardware prefetches. Subsequently, clones can be generated with software prefetch requests inserted in such a way that p is matched. In the design exploration runs, hardware prefetchers at the LLC may be turned off.

Previously herein, there is a discussion of how memory requests can be generated that correspond to the read, write, and prefetch memory requests of the original applications. In the following, there is a discussion of how the inter-arrival timing of the requests can be captured in MeToo clones.

The first question is how the inter-arrival timing information between memory traffic requests should be represented. One choice is to capture the inter-arrival as the number of processor clock cycles that elapsed between the current request and the one immediately in the past. Each inter-arrival can then be collected in a histogram to represent the inter-arrival distribution. One problem with this approach may be that the number of clock cycles is rigid and cannot be scaled to take into account the memory performance feedback loop.

Figure 27:
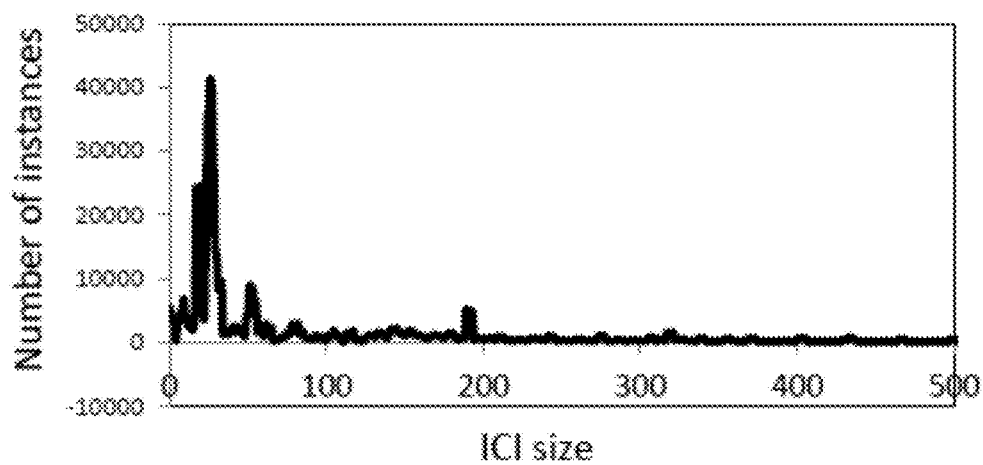
FIG. 27 is a graph showing an example ICI profile.

Thus, an alternative choice was investigated to measure the interarrival time in terms of the number of instructions that separate consecutive memory requests. This is referred to as Instruction Count Interval (ICI). An example of ICI profile is shown in FIG. 27. The x-axes shows the number of instructions that separate two consecutive memory requests (i.e. ICI size), while the y-axes shows the number of occurrences of each ICI size. The x-axes is truncated at 500 instructions. In the particular example in the figure, there are many instances of 20-40 instructions separating two consecutive memory requests, indicating a high level of Memory Level Parallelism (MLP).

The ICI profile alone may not account for the behavior we observe where certain ICI sizes tends to recur. ICI size recurrence can be attributed to the behavior of loops. To capture the temporal recurrence, ICI recurrence probability is collected in addition to the ICI distribution. The ICI sizes are split into bins where each bin represents similar ICI sizes. For each bin, the probability of the ICI sizes in that bin to repeat is recorded.

Together the ICI distribution and recurrence probability profile summarize the inter arrival timing of memory subsystem requests. However, they may still suffer from two shortcomings. First, the number of instructions separating two memory requests may not be linearly proportional to the number of clock cycles separating them. Not all instructions are equal or take the same amount of execution time on the processor. Second, the statistics are not capable of capturing the feedback loop yet.

The ICI distribution and recurrence profiles discussed above may not fully capture the timing of inter-arrival of memory subsystem requests due to several factors. First, in an out-of-order processor pipeline, the amount of Instruction Level Parallelism (ILP) determines the time it takes to execute instructions: higher ILP allows faster execution of instructions, while lower ILP causes slower execution of instructions.

Figure 28A:
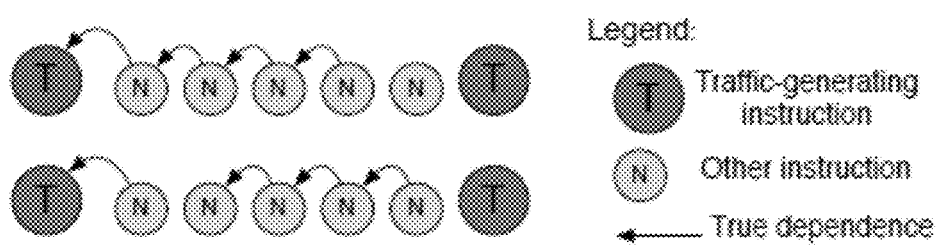
FIGS. 28A and 28B are examples of two cases of how dependences can influence inter-arrival pattern of memory requests.

One of the determinants of ILP is data dependences between instructions. For a pair of consecutive (traffic-generating) memory request instructions, the ILP of the instructions executed between them can determine how soon the second traffic-generating instruction occurs. FIG. 28A illustrates an example of two cases of how dependences can influence inter-arrival pattern of memory requests. In the figure, each circle represents one instruction. Larger circles represent traffic-generating instructions while smaller circles represent other instructions such as non-memory instructions, or loads/stores that do not cause memory traffic requests. The arrows indicate true dependence between instructions. The issue queue has 4 entries. In the first case, instructions can block the pipeline until the first memory request is satisfied. The second traffic-generating instruction can wait until the pipeline is unblocked. In the second case, while the first traffic-generating instruction is waiting, only one non-traffic instruction needs to wait. The other instructions will not block the pipeline and the second traffic-generating instruction can be issued much earlier since it does not need to wait for the first request to be satisfied. The figure emphasizes the point that although both cases show the same ICI size and the same number of instructions that have dependences, the inter-arrival time of memory requests may be very different in the two cases.

To capture such characteristics, instructions are categorized between a pair of traffic-generating instructions into two sets: a dependent set including instructions that directly or indirectly depend on the first traffic-generating instruction, and an independent set consisting of instructions that do not depend on the first traffic-generating instruction. For each pair of traffic generating instructions, we collect the size of dependent set and non-dependent sets and calculate ratio between the former and the latter. It is referred to as the dependence ratio or R. Across all traffic-generating instruction pairs with the same ICI size k, the dependence ratios are averaged into $\overline{R}_k$, to keep the profile compact and reduce the complexity of the clone generation process.

Next, for each of the dependent and independent set, instructions in the set are analyzed to discover true dependences within the ICI. If two instructions are found to have true dependence, their dependence is measured as distance $\delta$, defined as the instruction count between the producer and the consumer instructions. Let $D_\delta$ be a counter that represents the number of occurrences of dependence distance $\delta$ (where $\delta$ varies), within an ICI. The occurrences of dependence distance $\delta$ are collected over all ICIs of size k and represent it in a 2D matrix $D_{\delta k}$, separately for the dependent set and for the independent set. The dependence distance profile was collected separately for the dependent and independent sets because instructions in the dependent set have a larger influence on interarrival timing of request.

Figure 28B:
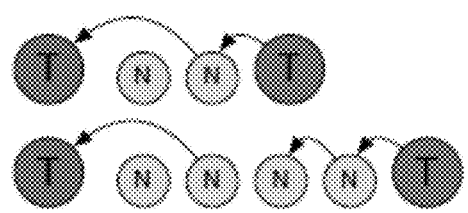

So far, the dependence of non traffic generating instructions on themselves or on a traffic-generating instruction in an ICI has been described. However, the dependence between two traffic instructions is an even more important determinant of the timing of the inter-arrival of memory subsystem requests. For example, let us observe the instructions shown in FIG. 28, which shows a pair of traffic-generating instructions with an ICI size of 2. However, since the second traffic-generating instruction depends on the first one, the inter-arrival time of the two memory requests is at least the time it takes for the first instruction to get its data. In the second pattern, although the ICI size of 4 is larger than in the first portion, since there is no dependence between the two traffic generating instructions, the inter-arrival time of the memory requests may be shorter. To distinguish these situations, for each pair of traffic-generating instructions, it is recorded whether they have true dependence relationship or not. To achieve that, $M_k$ was defined as the fraction of pairs of traffic generating instructions that have dependences when their ICI size is k.

The dependence distance statistics provides the timing feedback loop between memory performance and processor performance. When a request is stalled in the memory controller queue for whatever reason, the instruction that causes the request can also stall in the processor pipeline, and causes dependent instructions to also stall, unable to execute. In turn, this leads to an increase in the inter-arrival time for the future memory subsystem request. The increased inter-arrival depends on whether the next traffic generating instruction is dependent on the current one being stalled or not. These effects are captured in the statistics that are collected for MeToo clone generation process.

In addition to the ILP, another determinant of how the ICI affects inter-arrival time is the instruction mix that the ICI is comprised of. For example, an integer division (DIV) may take more cycles to execute than simpler arithmetic instructions. The numbers of floating-point and integer functional units may also influence the ICI execution time. Similar to the ILP information, the instruction type mix in each ICI was profiled, separately for the dependent and independent sets. The number of instructions with the same type and within the same ICI interval was averaged. The final profile is a 2D matrix with elements $\overline{N}_{km}$, where the ICI size k varies, and the instruction type m (e.g. 0 for integer addition, 1 for floating-point addition, and so on) varies. Control flow is removed by converting branches into arithmetic instructions while preserving their data dependences during clone generation.

The inter-arrival time between two traffic-generating requests at the memory subsystem is also affected by how long the first traffic generating instruction takes to retrieve data from the DRAM, which depends on the DRAM latency to complete the request, including the read/write order, bank conflict, row buffer hit or miss. These events are dependent on the temporal and spatial locality of the requests. To capture locality, the probability was collected that the next request falls to the same address region of size r as the current request. The probability is denoted as $P_r$. $P_r$ may be collected for various values of r's but we find that tracking the probability for 1 KB region provides sufficient accuracy.

Figure 29:
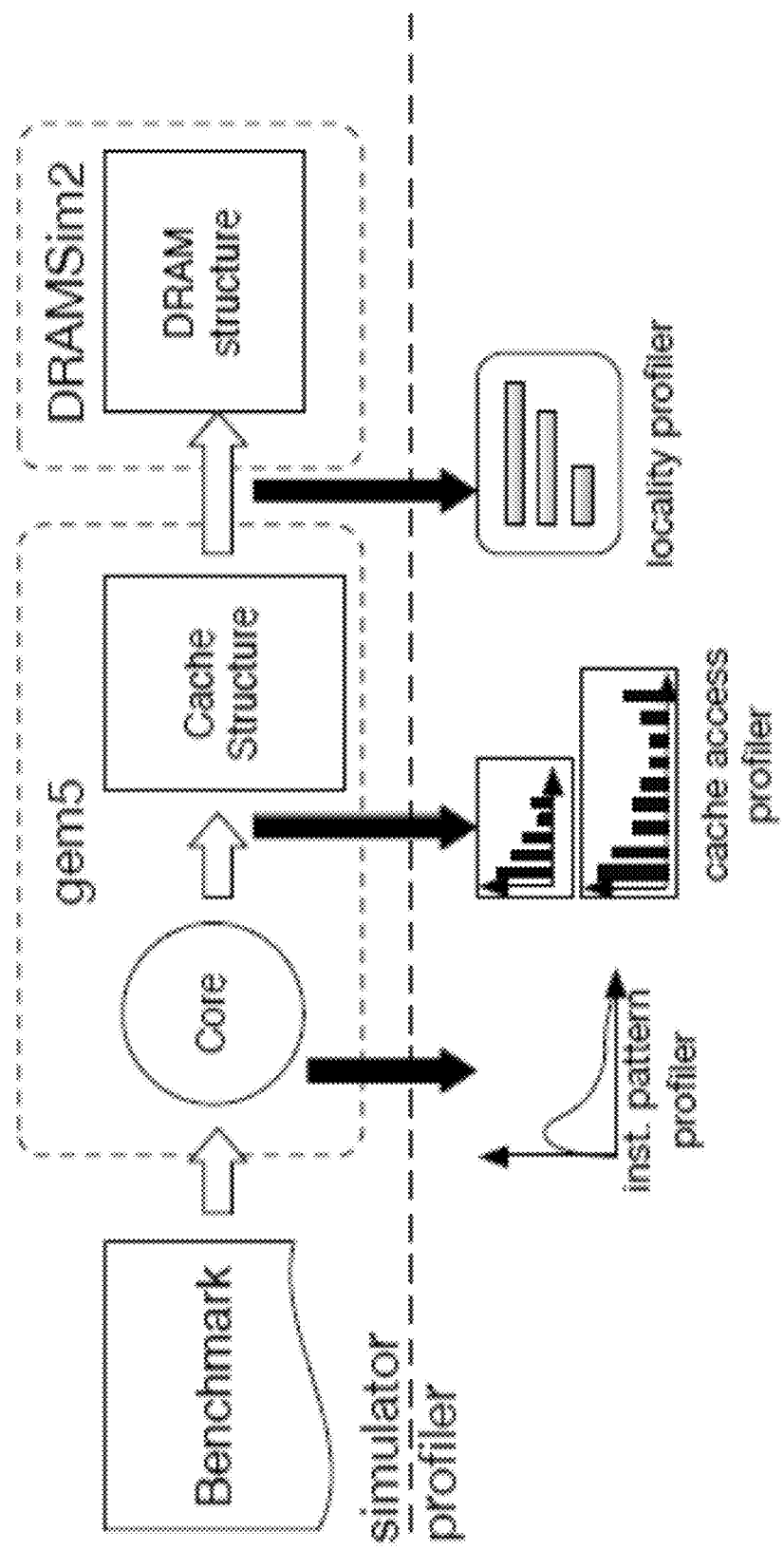
FIG. 29 is a diagram that shows the profiling infrastructure that MeToo implements.

To summarize, Table 3 below shows the statistics that are collected by the profiler. FIG. 29 is a diagram that shows the profiling infrastructure that MeToo implements. The infrastructure was implemented on top of gem5 processor simulator and DRAMSim2 DRAM simulator. Each part of the profiler is a stand alone module, separated from gem5's original code, and works individually. To collect the statistics shown in Table 3, profiling probes were placed at three places while original applications run on a simulator.

TABLE 3

| Notation | What It Represents |
|---|---|
| $S_{ij}$ | stack distance profile probability at the $i^{th}$ set and $j^{th}$ stack position |
| $S_i$ | stack distance profile probability at the $i^{th}$ set |
| $WC_{ij}$ | probability of write to clean block at the $i^{th}$ set and $j^{th}$ stack position |
| $WD_{ij}$ | probability of write to clean block at the $i^{th}$ set and $j^{th}$ stack position |
| $f_D$ | fraction of LLC blocks that are dirty |
| $f_W$ | fraction of memory requests that are write backs |
| $Rec_k$ | recurrence probability of ICI of size k |

TABLE 3-continued

| Notation | What It Represents |
| --- | --- |
| $\overline{R}_k$ | dependence ratio (number of dependent instructions divided by number of independent instructions) for ICI of size k |
| $\overline{N}_{km}$ | the number of instructions of type m in an ICI of size k. |
| $P_r$ | probability the next memory request is to the same region of size r as the current memory request. |
| $D_{\delta k}$ | occurrences of dependence distance δ over all ICIs of size k |
| $M_k$ | probability that a pair of traffic-generating instructions exhibit a true dependence relation |
| $f_{mem}$ | the fraction of instructions that are memory instructions |
| $\rho_k$ and $\overline{\rho}_k$ | percentage of traffic-generating instructions in ICI of size k that triggers prefetches (single instance and averaged over all ICIs of size k) |

To collect cache statistics, a cache stack distance profiler was used on the simulator's data caches input ports. To collect the instruction statistics, the decode stage of the processor pipeline was profiled. During each instruction's life time in pipeline, true dependence relation and the producer and consumer instructions were recorded, and they were track with regard to whether they will become a traffic-generating instruction or not. This list was maintained with a window size of N. When a new instruction is added into the list and the size of the list is larger than N, the oldest instruction was evicted from the list. When the evicted instruction is a traffic-generating instruction, the list was analyzed from oldest instruction to the youngest instruction to find the next traffic-generating instruction. If such an instruction is found, the two traffic-generating instructions become a pair that form an ICI. Then, statistics related to the ICI were collected, such as the ICI size, dependence ratio, instruction type mix, etc. If a second traffic-generating instruction is not found, this means that the next traffic-generating instruction is too far from the evicted instruction and the ICI size is larger than N, then the statistics were ignored. In one example set up, N=1500 was used. What this means is that very large ICI sizes are ignored. In practice, ignoring the ICI statistics for very large ICIs is fine because their inter-arrival timing is very likely larger than the memory subsystem latency, which means the behavior is as if they appear in isolation.

Finally, the locality statistics may be collected between the cache and memory subsystem.

As can be seen in the profiles, not just any actual timing information is used. Actual timing information is architecture dependent and is sensitive to hardware changes. However, information such as the instruction order, instruction types, dependences, etc. are independent of the configurations of the memory subsystem. Using architecture-independent statistics enables the feedback loop from new memory subsystem configurations to affect the processor performance, and in turn determines the memory request inter-arrival pattern. This makes MeToo clones independent also distinguishes MeToo from prior cloning studies which either rely on static time stamps and hence ignore the memory performance feedback loop, or do not take into account timing at all.

After profiling, a MeToo clone is generated stochastically. Essentially, multiple random numbers are generated, and for each instruction to generate for the clone, a process of random walk is performed over the statistics that were collected during profiling, shown in Table 3. This process is repeated until we have generated sufficient number of instructions desired for the clone. Through random walk, the clone that is produced conforms the behavior of the original applications, but without utilizing the original code or data of the original application, thereby ensuring that the application remains proprietary.

One important design issue related to random walk is whether to adjust the statistics dynamically during the generation process, or keep the statistics unchanged. The issue is related to how the clone generation may converge to the statistics: weak and strict convergence. Strict convergence requires the sequence of instructions generated for the clone to fully match the statistics of the profiled original application. This requires the statistics to be recalculated after each generated instruction. At the end of generation, all the counts in the statistics may be zero or very close to zero. This is akin to picking a ball from a bin with multiple balls of different colors without returning it to the bin. After all balls are picked, the picked balls have the same mix of colors as prior to picking the balls. Weak convergence, on the other hand, does not adjust or recalculate the statistics after an instruction is generated. This is akin to picking a ball from a bin with multiple balls of different colors, and returning the ball into the bin after each picking. The mix of colors of picked balls is not guaranteed to converge to the original mix of colors, however with larger number of picks they will tend to converge. For cloning, the number of instructions generated has a similar effect as the number of picked balls. Strict convergence is very important for generating small clones with a small number of instructions, because weak convergence may not have sufficient trials for samples to converge to the population. However, for large clones with a large number of instructions, weak convergence is good enough. A drawback with strict convergence is that it is not always possible to satisfy when there are many different statistics that have to be satisfied simultaneously. Convergence is not guaranteed, and clone generation may stall without converging. With weak convergence, clone generation is guaranteed completion. For MeToo, clone generation uses a mixed approach. For distribution statistics, instruction count distribution, dependence distance distribution, instruction type mix distribution, and most of cache access pattern statistics, the generation process uses strict convergence. They are important characteristics that directly influence the intensity of traffic requests. For other parameters like the ICI recurrence probability and locality statistics, we use weak convergence. It is less important to be highly accurate for these parameters since they only represent general behavior.

Figure 30:
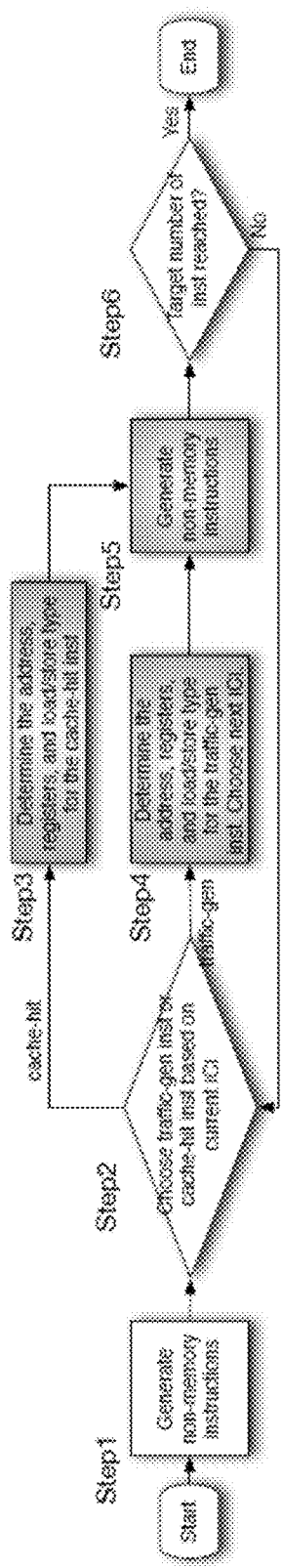
FIG. 30 is a method of an example method showing a high-level view of the clone generation flow chart.

FIG. 30 illustrates a method of an example method showing a high-level view of the clone generation flow chart. Referring to FIG. 30, each one of the grey colored boxez represents a generation step that involves multiple substeps. The high level steps in the generation process follow:

1) As an initialization step, warm up the caches with randomly generated memory accesses.

2) This step chooses the type of a memory instruction (ld/st) to generate: either a traffic-generating memory instruction or a memory instruction that hits in any (L1 or L2) cache. For the first memory instruction, generate a traffic-generating instruction and choose a random ICI size based on the ICI distribution. Otherwise, check if the number of instructions generated so far has satisfied the ICI size. If not, generate a memory instruction that results in a cache hit and go to Step 3. If the ICI size is satisfied, start a new ICI by generating a new traffic-generating instruction. Go to Step 4.

3) Determine the address and registers to be used by the instruction, and whether the instruction should be a load or store. For address, use $S_i$ to choose the set and $S_{ij}$ to choose the stack distance position. For registers, use $\overline{R}_k$ and $D_{\delta k}$ to determine if the instruction should be dependent on a previous instruction or the previous traffic-generating instruction. For load/store, check if the block is dirty or clean, then use the $WC_{ij}$ or $WD_{ij}$ (and also fD and fW) to determine if the instruction should be a load or store, respectively. Finally, generate this instruction and continue to Step 5.

4) Determine the address and registers to be used by the instruction, and whether the instruction may be a load or store. For address, use $P_r$ to determine if the address should be within the region of size r from the previous traffic generating instruction. For registers, use $M_k$ to determine if this instruction should depend on the previous traffic generating instruction. Determine load vs. store based on $WC_{ij}$ for the case where j is larger than the cache associativity. $f_D$ and $f_W$ are also consulted as needed. Finally, generate this instruction, then choose a new ICI size based on the ICI recurrence probability and ICI size probability distribution, and continue to Step 5.

5) Generate at least one non-memory instructions, based on the number of non-memory to memory instruction ratio of the original benchmark. Determine each non-memory instruction type by using $\overline{N}_{km}$, and determine the registers of each instruction using $\overline{R}_k$ and $D_{\delta k}$. Go to Step 6.

6) Determine if the expected number of instructions has been generated. If so, stop the generation. If no instruction can be generated any more, also stop the generation. Otherwise, go to Step 2.

These steps may be run in a loop until the desired number of traffic instruction pairs are generated. Since we incorporate strict convergence approach, there is probability that not all statistics fully converge. In this case, the final number of instructions may be slightly fewer than the target number of instructions. The generated instructions are implemented as assembly instructions, after that they are bundled into a source file that can be compiled to generate an executable clone.

To generate and evaluate the clones, we use a full-system simulator gem5 [16] to model the processor and cache hierarchy, and DRAMSim2 [17] to model the DRAM memory subsystem and the memory controller. The profiling run is performed with a processor and cache hierarchy model with parameters shown in Table 4 below. The L2 cache is intentionally chosen to be relatively small so that its cache misses will stress test MeToo's cloning accuracy.

TABLE 4

Baseline Hardware Configuration Used for Profiling and Clone Generation

| | |
|---|---|
| Core | dual core, each 2 GHz, X86 ISA. |
| | 8-wide out-of-order superscalar, 64-entry IQ |
| Cache | L1-D: 32 KB, 4-way, 64 B block, LRU |
| | L2: 256 KB, 8-way, 64 B block, LRU, non-inclusive |
| Bus | 64-bit wide, 1 GHz |
| DRAM | DDR3, 2 GB |
| | 8 banks/rank, 32K rows/bank, 1 KB row buffer size |
| | 1.5 ns cycle time |
| | Address mapping: chan:row:col:bank:rank |

Suitable benchmarks were used for evaluation. Each benchmark was fastforwarded to skip the initialization stage and clone one particular phase of the application consisting of 100 million instructions (to capture other phases, we can choose other 100 million instruction windows as identified by Simpoint). The clone that we generate contains 1 million memory references, yielding a clone that is roughly 20-50× smaller than the original application, allow much faster simulation. For example, the original benchmarks usually run for several hours while the clones finish running in several minutes. The clone generation itself typically takes a couple of minutes.

MeToo clones were validated for two workload scenarios: 10 memory intensive benchmarks running alone, and 10 multi-programmed workloads constructed from randomly pairing individual benchmarks on a dual-core processor configuration. The benchmarks that are categorized as memory intensive are ones that show L2 MPKI (misses per kilo instructions) of at least 3, and the ratio of L2 cache misses to all memory references of at least 1%. For co-scheduled benchmarks, both benchmarks were run with the same number of instructions. If one benchmark finishes earlier than the other one, we stall its core and wait for the other benchmark to finish. Results were collected only after both benchmarks finish their windows of simulation.

MeToo profiles are collected using the hardware configuration shown in Table 3, which are then used to generate clones. The clones are validated in two steps. In the first step, they are compared against the original benchmarks using the baseline machine configuration (Table 3). The purpose of this step is to see if the clones faithfully replicate the behavior of the benchmarks on the same machine configuration for which profiles are collected.

The second step of the validation has a goal of testing the clones' ability to be used for design exploration of the memory subsystem in place of the original benchmarks. Thus, in the second step, the previously-generated clones were run on new hardware configurations that were not used for collecting profiles. These hardware configurations are listed in Table 4. In the configurations, the memory subsystem configurations were varied significantly, by varying the bus width from 1 to 16 bytes, bus clock frequency from 100 MHz to 1 GHz. The DRAM cycle time was varied from 1.5 ns to 12 ns, and vary address mapping schemes by permuting the address bits used for addressing channels, ranks, banks, rows, and columns. This has the effect of producing a different degree of bank conflicts for the same memory access streams. We also vary the L2 prefetcher so that we can specifically test MeToo's clone generation's ability to reproduce the effect of hardware prefetches using software prefetch instructions. Finally, mentioned herein is the assumption that MeToo clones are designed for design exploration of the memory subsystem while keeping the processor and caches fixed. However, since the instruction dependence and mixes were captured, a limited range of core configuration variations was added to just to test how well MeToo clones' memory performance feedback loop works under different core configurations.

Figure 31A:
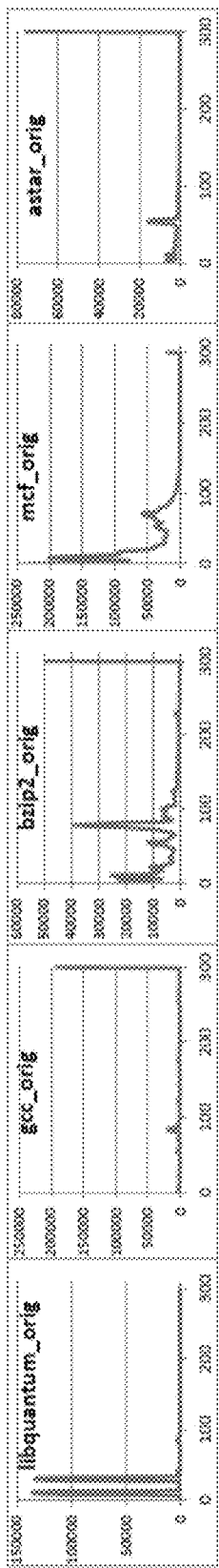
FIGS. 31A-31D are graphs showing a comparison of inter-arrival timing distribution of memory requests of the original application versus their clones.
Figure 31B:
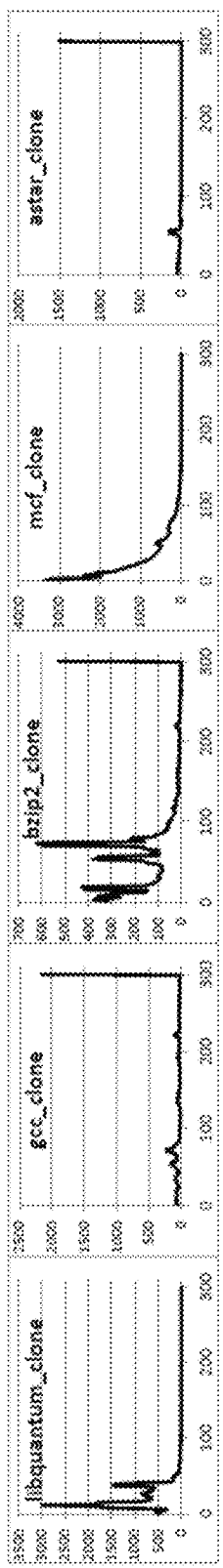
Figure 31C:
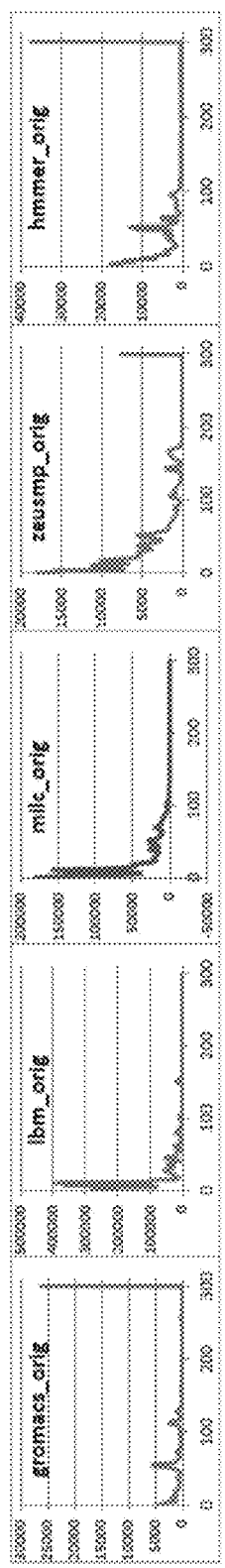
Figure 31D:
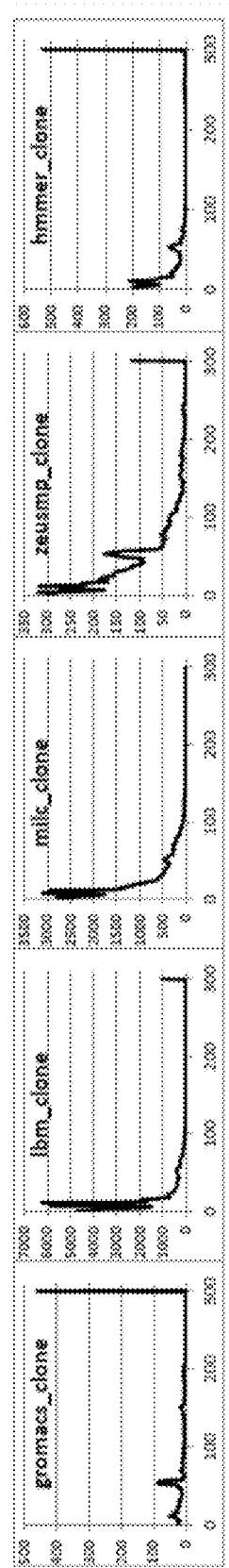

In order to validate MeToo clones, we collect inter-arrival time distribution statistics, shown in FIGS. 31A-31D, which are graphs showing a comparison of inter-arrival timing distribution of memory requests of the original application versus their clones. FIGS. 31A and 31C of the charts show the inter-arrival time distribution for the original benchmarks, while FIGS. 31B and 31D of the charts show the inter-arrival time distribution for MeToo clones. The x-axes show the inter-arrival time (in bus clock cycles), while the y-axes shows the number of occurrences of each inter-arrival time. To improve legibility, inter-arrival times larger than or equal to 300 clock cycles were aggregated into one single bar, and smooth all inter-arrival times smaller than 300 cycles with a 5-cycle window moving average. The figures show that for most benchmarks, there are inter-arrival times that are dominant. There is a significant variation between benchmarks as well. Some benchmarks such as libquantum, lbm, and milc, have mostly small inter arrival times (less than 50 cycles). Others, such as bzip2, mcc, zeusmp, hmmer, have significant inter arrival times between 50-200 cycles. Some benchmarks have inter-arrival times larger than 200, such as gcc, gromacs, hmmer, and astar.

FIGS. 31A-31D also show that MeToo clones are able to capture the dominant inter-arrival times in each benchmark with surprising accuracies. The dominant inter-arrival times are mostly replicated very well, however some of them tend to get a little bit diffused. For example, in libquantum, the two dominant inter-arrival times are more diffused in the clone. Small peaks in the inter-arrival times may also get more diffused. For example, the small peak at about 80 cycles for mcf and milc are diffused. The reason for this diffusion effect is that MeToo clones are generated stochastically, hence there is additional randomness introduced in MeToo that was not present in the original benchmarks. However, the diffusion effect is mild. Overall, the figures show that MeToo clones match the inter-arrival distribution of the original benchmarks well. Recall that what MeToo captures is inter-arrival statistics in terms of ICI size, rather than number of clock cycles. The good match in interarrival timing shows that MeToo successfully translates the number of instructions in the intervals into number of clock cycles in the intervals.

Figure 32A:
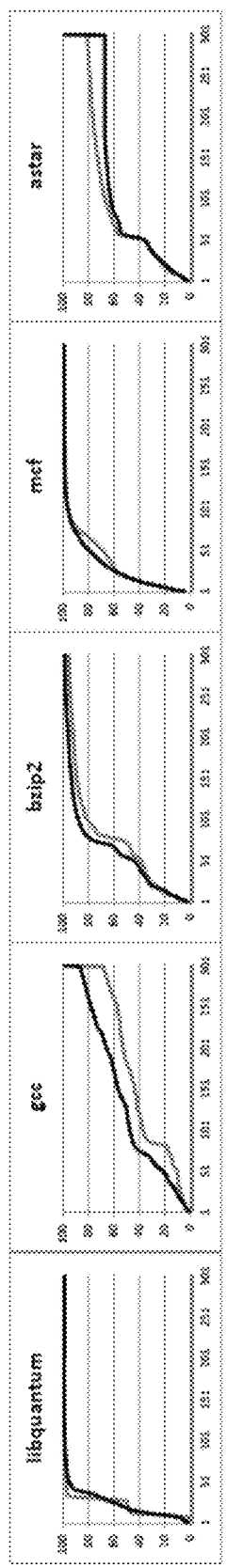
FIGS. 32A-32D are graphs showing cumulative distribution of inter-arrival times of memory requests of benchmarks versus clones, in standalone (FIGS. 32A and 32B) and co-scheduled modes (FIGS. 32C and 32D)
Figure 32B:
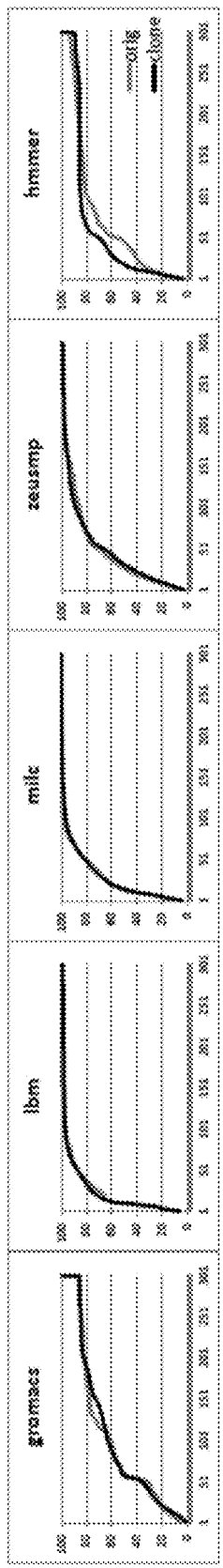
Figure 32C:
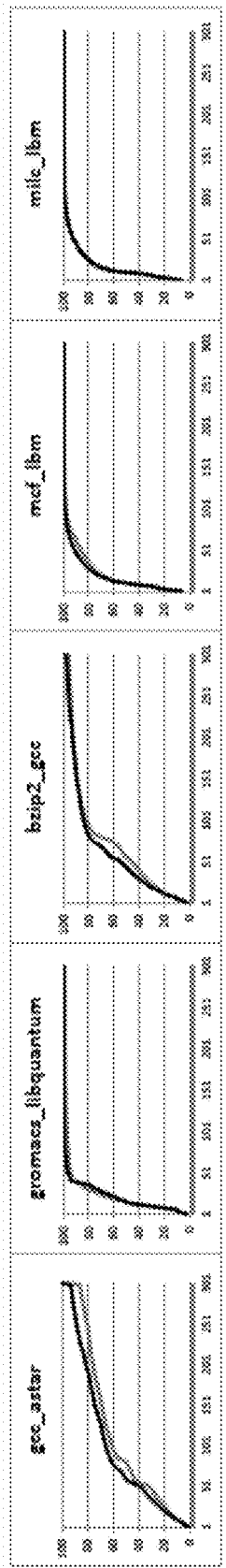
Figure 32D:
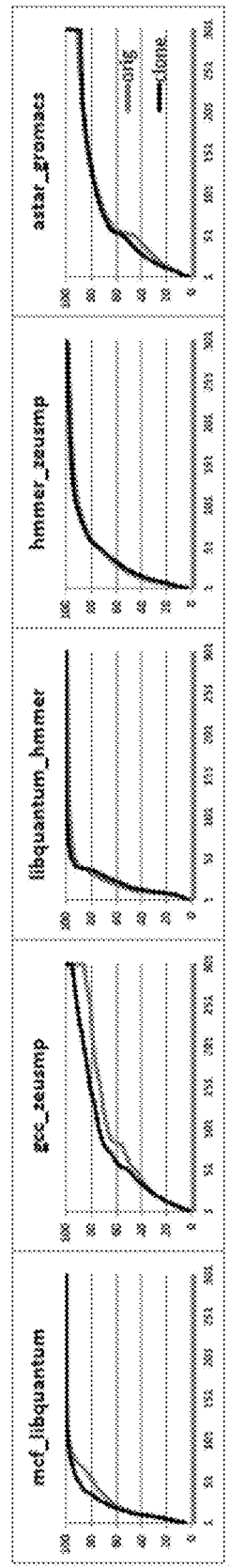
Figure 33A:
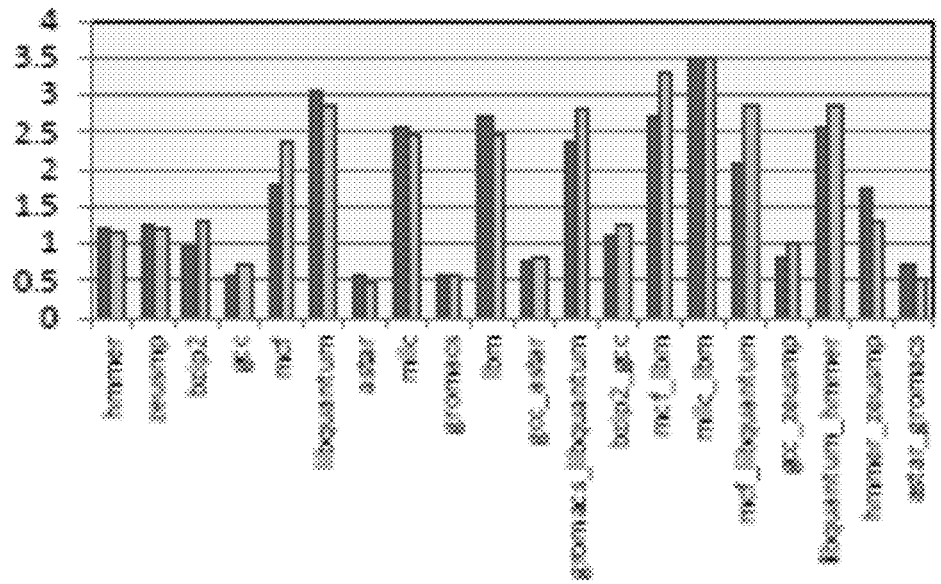
FIGS. 33A-33D are charts that show a comparison of results obtained by the original benchmarks versus clones in terms of DRAM power, aggregate DRAM bandwidth, memory controller's scheduling queue length, and bus queuing delay.
Figure 33B:
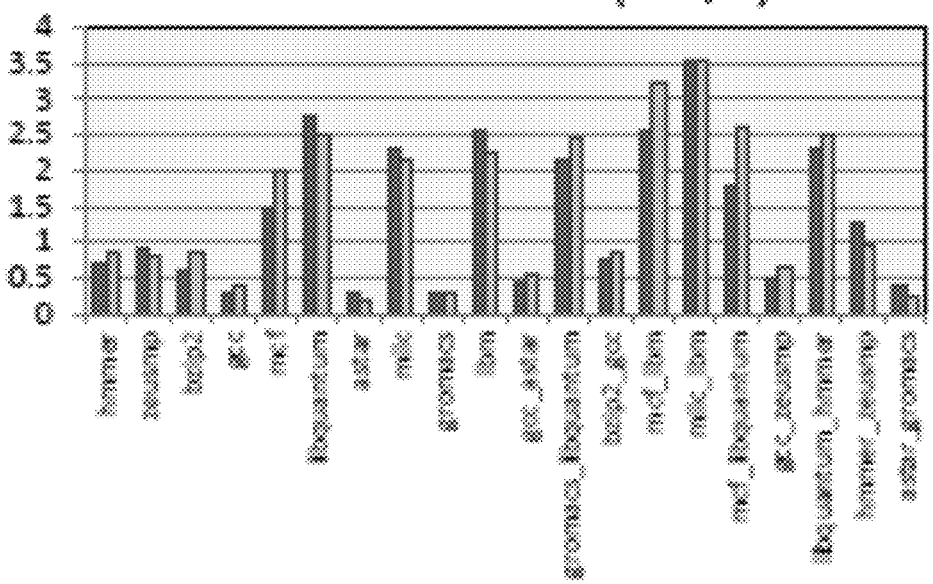
Figure 33C:
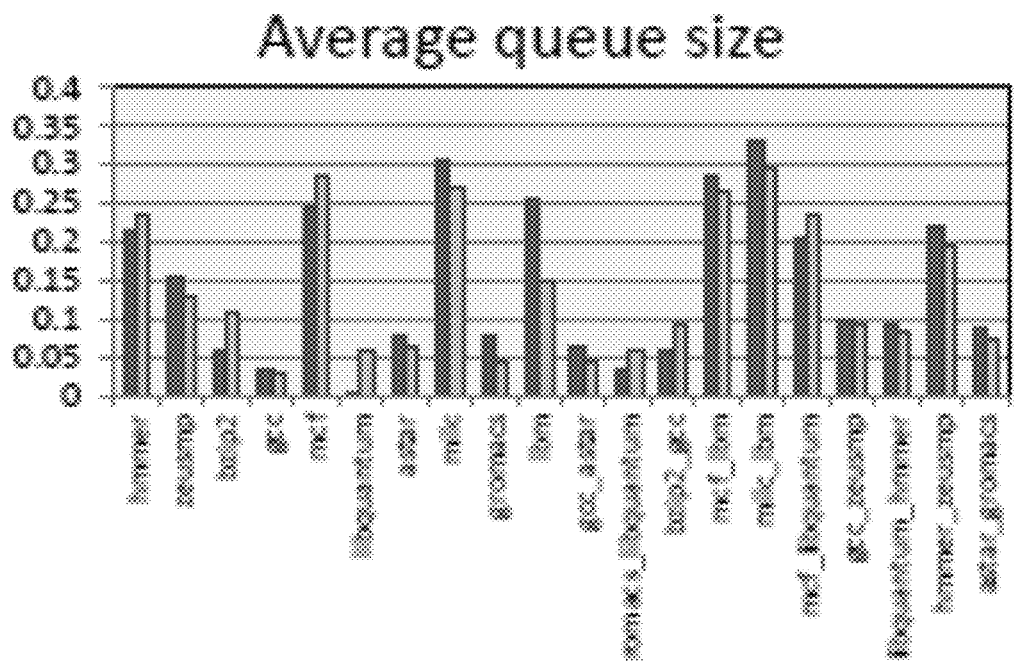
Figure 33D:
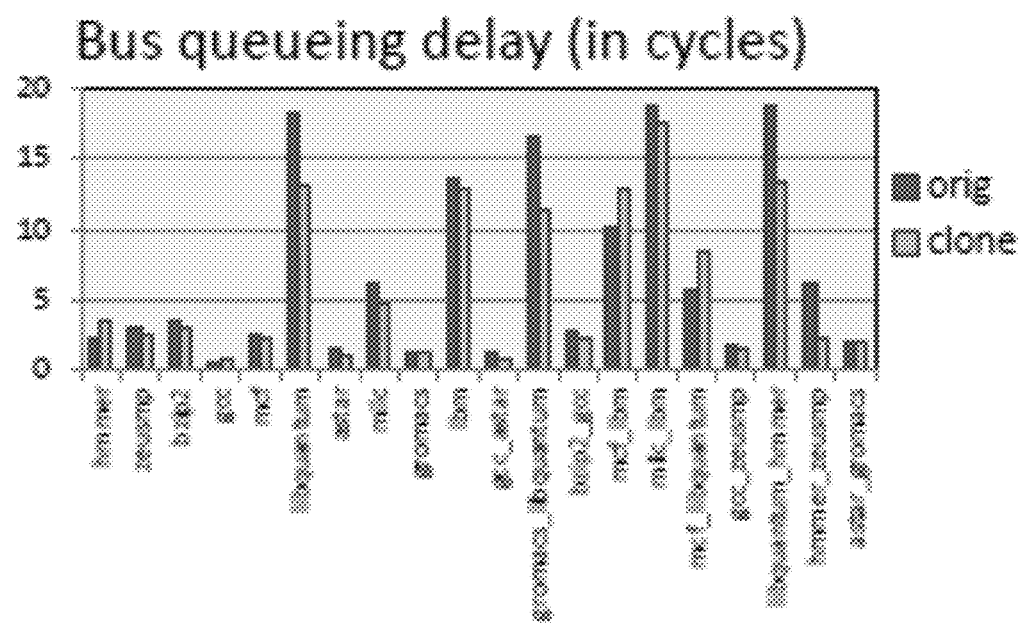

To get a better idea of how well MeToo clones and the original benchmarks fit, we super impose the cumulative probability distribution of the inter-arrival timing statistics of the clones and benchmarks in FIGS. 32A-32D, which illustrate graphs showing cumulative distribution of inter-arrival times of memory requests of benchmarks versus clones, in standalone (FIGS. 32A and 32B) and co-scheduled modes (FIGS. 32C and 32D). The x-axes shows the inter-arrival time in clock cycles, while the y-axes shows the fraction of all instances of inter-arrivals that are smaller than or equal to the inter-arrival time. FIGS. 32A and 32B show individual benchmarks running alone, compared to the clones running alone. FIGS. 32C and 32D show co-scheduled benchmarks running together on different cores, compared to their respective clones co-scheduled to run together on different cores. As the figures show, MeToo clones are able to match the inter-arrival patterns of the original benchmarks both in standalone mode as well as in co-scheduled mode. The fitting error is defined as the absolute distance between the curve of the clone and the curve of the original benchmark, averaged across all inter-arrival times. The fitting error, averaged across all standalone benchmarks, is small (4.2%). It is expected the fitting error to be higher on co-scheduled benchmarks because there is an additional memory feedback loop where one benchmark's memory request timing causes conflicts in shared resources (e.g. in the memory scheduling queue, channels, banks, etc.), and the conflict ends up affecting the other benchmark's memory request timing. However, results indicate an even smaller fitting error for the co-scheduled benchmarks (2.8%). This is a good news as it indicates MeToo clones do not lose accuracy, and instead improve accuracy, in the co-scheduled execution mode common in multicore systems. A probable cause for this is because coscheduling increases the degree of randomness in the inter-arrival time that come from two different benchmarks, moving their degree of randomness closer to those of MeToo clones.

Now let us look at whether matching inter-arrival timing of memory requests translate to good match in DRAM power consumption, DRAM bandwidth, average MC queue size, and bus queuing delay. These are end metrics that are important for the design of memory subsystem. For example, the average queue size gives an indication what may be an appropriate memory controller scheduling queue size. The average queue size is measured as the average number of entries in the queue at the time a new request is inserted into the queue. For the DRAM queue length, and bus queuing delay we use 12 ns DRAM cycle time, and 1 byte-wide memory bus, in order to stress the bus and memory controller. FIGS. 33A-33D are charts that show a comparison of results obtained by the original benchmarks versus clones in terms of DRAM power, aggregate DRAM bandwidth, memory controller's scheduling queue length, and bus queuing delay. These figures show these metrics for benchmarks and clones running alone as well as co scheduled benchmarks and co-scheduled clones running on a multicore configuration. Across all cases, the average absolute errors are 0.25 watts, 0.18 GB/s, 0.03, and 1.06 ns for DRAM power consumption, DRAM bandwidth, average queue length, and queuing delay, respectively, which are small.

Figure 34:
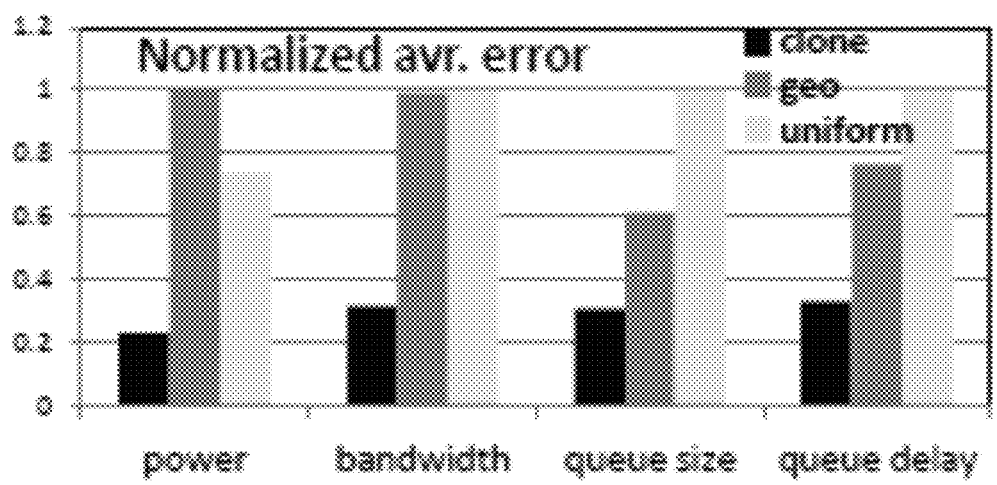
FIG. 34 is a graph showing fitting errors of MeToo clones, normalized to geometric or uniform inter-arrival clones.

FIG. 34 illustrates a graph showing fitting errors of MeToo clones, normalized to geometric or uniform inter-arrival clones. In particular, FIG. 34 shows the comparison of errors in the four metrics from the previous figure for MeToo clones, versus geometric interarrival and uniform inter-arrival. The y-axes shows the average absolute errors (across all workloads), normalized to the largest bar in each case. The figure shows MeToo clones' errors are only a fraction of errors (at most 35%) from using geometric or uniform inter arrival. This indicates that geometric/Poisson arrival pattern assumed in most queuing models is highly inaccurate for use in memory subsystem performance studies.

Figure 35:
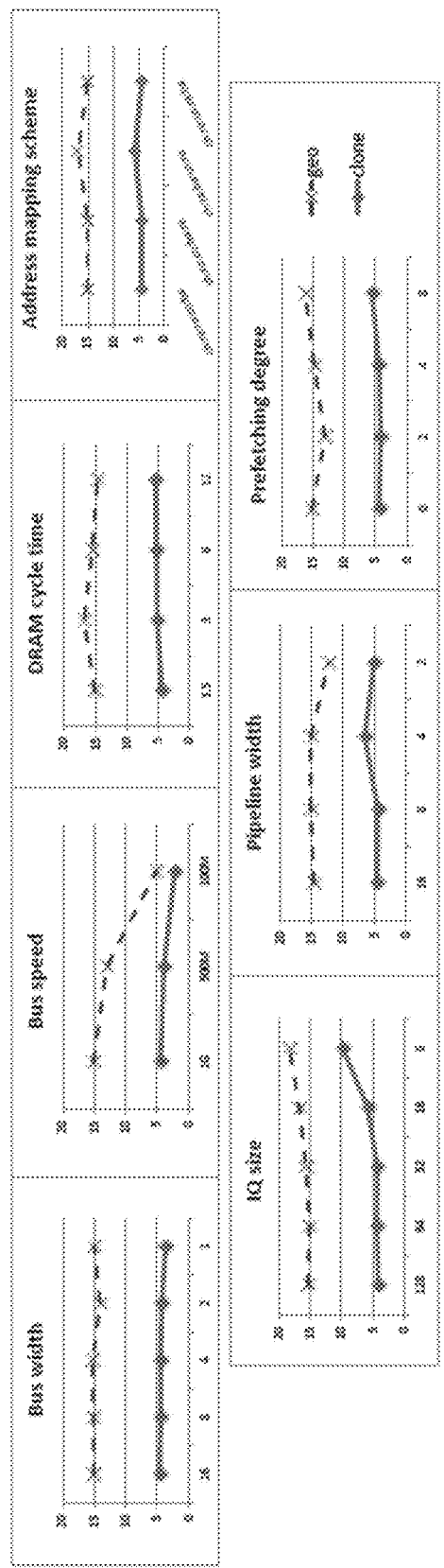
FIG. 35 depicts graphs showing the fitting errors of MeToo clones versus geometric inter-arrival for various machine configurations, with varying bus width, bus frequency, DRAM cycle time, DRAM address mapping scheme, pipeline width, issue queue size, and prefetching degree.

FIG. 35 illustrates graphs showing the fitting errors of MeToo clones versus geometric inter-arrival for various machine configurations, with varying bus width, bus frequency, DRAM cycle time, DRAM address mapping scheme, pipeline width, issue queue size, and prefetching degree. None of the configurations was used for profiling and clone generations. The parameters for these configurations are shown in Table 5 below.

TABLE 5

Hardware Configurations Used for Memory Design Exploration

| | Parameter | Variation |
|---|---|---|
| Core | Pipeline width | 2, 4, 8, 16 |
| | IQ size | 8, 16, 32, 64, 128 |
| Cache | L2 prefetcher | Stride w/degree 0, 2, 4, 8 |
| Bus | Width | 1, 2, 4, 8, 16 Bytes |
| | Speed | 100 MHz, 500 MHz, 1 GHz |
| DRAM | Cycle time | 1.5 ns, 3 ns, 6 ns, 12 ns |
| | Address mapping | chan:row:col:bank:rank |
| | | chan:rank:row:col:bank |
| | | chan:rank:bank:col:row |
| | | chan:row:col:rank:bank |

Across all cases, MeToo clones' errors largely remain constant at about 5%, except in very extreme cases, for example when the instruction queue is very small (8 entries)—which is not a part of memory subsystem design exploration parameter. The fitting errors for MeToo clones are typically only one third of the fitting errors obtained using clones that rely on geometric inter-arrival. The results demonstrate that MeToo clones can be used to substitute the original applications across a wide range of memory subsystem configurations, and even including some processor pipeline configurations.

Herein, a framework for generating synthetic memory traffic is disclosed that can be used for memory subsystem design exploration in place of proprietary applications or workloads. MeToo relies on profiling and clone generation methods that capture the memory performance feedback loop, where memory performance affects processor performance which in turn affects inter-arrival timing of memory requests. The clones were validated, and it was shown that they achieved an average error of 4.2%, which is only a fraction of the errors compared to competing approaches of using geometric inter-arrival (commonly used in queuing models) and uniform inter-arrival.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, may be apparent from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. Terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The block diagrams in the figures illustrate the architecture, functionality, and operation of possible implementations of systems, methods and computer program products according to various embodiments of the present subject matter. In this regard, each block in the block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the present subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present subject matter has been presented for purposes of illustration and description, but is not intended to be exhaustive or limited to the present subject matter in the form disclosed. Many modifications and variations will be apparent to those of ordinary skill in the art without departing from the scope and spirit of the present subject matter. The embodiment was chosen and described in order to best explain the principles of the present subject matter and the practical application, and to enable others of ordinary skill in the art to understand the present subject matter for various embodiments with various modifications as are suited to the particular use contemplated.

The descriptions of the various embodiments of the present subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
   receiving data indicative of a memory access behavior that results from instructions executed on a process, wherein the data are address stream values comprising an address tuple;
   determining at least one of a stride tuple statistical profile and an address tuple statistical profile of the memory access behavior based on the received data; and
   generating a clone of the data based on the at least one of the stride tuple statistical profile and the address tuple statistical profile in order to mimic the memory access behavior;
   wherein determining a stride tuple statistical profile of the memory access behavior comprises:
   calculating a difference between consecutive address stream values, wherein the calculation occurs between a consecutive initial address stream value and a subsequent address stream value;
   repeating the difference calculation between the subsequent address stream value and a next consecutive address stream value until a last address stream value is reached;
   determining a probability of a stride tuple transition from a first stride tuple to a second stride tuple; and
   repeating the probability determination between a subsequent stride tuple value and a next consecutive stride tuple value until a last stride tuple value is reached.

2. The method of claim 1, wherein the address tuple has a length of N≥0.

3. The method of claim 1, wherein determining a probability of stride tuple transition comprises dividing the number of occurrences of the second stride tuple by the number of occurrences of the first stride tuple.

4. The method of claim 1, wherein the stride tuple has a length of N≥1.

5. The method of claim 1, wherein generating a clone of the data comprises generating a synthetic memory access stream including randomly-generated addresses based on the at least one of the stride tuple statistical profile and the address tuple statistical profile.

6. The method of claim 1, wherein the stride tuple statistical profile comprises a stride history table that displays at least one of a previous stride and predicts at least one of a next stride.

7. The method of claim 6, wherein the stride tuple statistical profile comprises a stack distance probability table.

8. The method of claim 6, further comprising generating a binary clone based on the stride tuple statistical profile.

9. A method comprising:
   receiving data indicative of a memory access behavior that results from instructions executed on a processor and cache hierarchy;
   determining a statistical profile of the memory access behavior, wherein the statistical profile indicates feedback loop timing information of the memory access behavior and wherein the determination comprises:
   categorizing memory access instructions into instructions that depend on a first traffic-generating instruction and that do not depend on the first traffic-generating instruction;
   computing, for each dependency between instructions, an instruction count between a dependent instruction and an instruction upon which the dependent instruction depends; and
   creating the statistical profile based on the number of categorized memory access instructions and the computed instruction count; and
   generating a clone of the executed instructions based on the statistical profile for use in simulating the memory access behavior.

10. The method of claim 9, wherein the data indicates memory requests to a memory subsystem.

11. The method of claim 10, wherein the data indicates one or more of a read request and a write request to the memory subsystem.

12. The method of claim 11, wherein the data indicates one or more of a read request and a write request to the memory subsystem and produced by a last level cache (LLC).

13. The method of claim 10, wherein the data indicates a stack position distance for each of the memory requests to the memory subsystem.

14. The method of claim 10, wherein the data indicates write backs associated with dirty blocks in the memory subsystem.

15. The method of claim 9, wherein determining a statistical profile comprises determining a number of instructions that separate memory requests based on the received data.

16. The method of claim 15, wherein the number of instructions indicates the number of instructions separating two consecutive memory requests.

17. The method of claim 9, wherein the statistical profile comprises a stack distance profile probability for a plurality of stack positions in a memory subsystem.

18. The method of claim 9, wherein the statistical profile comprises a probability of write to clean block for a plurality of stack positions in a memory subsystem.

19. The method of claim 9, wherein the statistical profile comprises information about a number of last level cache (LLC) blocks that are dirty.

20. The method of claim 9, wherein the statistical profile comprises information about a number of memory requests that are write backs.

21. The method of claim 9, wherein the statistical profile comprises a recurrence probability of instructions that separate memory requests by a predetermined number of instruction counts.

22. The method of claim 9, wherein the statistical profile comprises a probability of a next memory request being to the same memory region of a predetermined size as a current memory request.

23. The method of claim 9, wherein the statistical profile comprises information about a number of occurrences of a predetermined distance over dependent instructions.

24. The method of claim 9, wherein the statistical profile comprises a probability of a pair of traffic-generating instructions having a true dependence relation.

25. The method of claim 9, wherein the statistical profile comprises information about a number of traffic-generating instructions having a dependent relation.

26. The method of claim 9, wherein generating a clone comprises generating the clone stochastically based on the statistical profile.

* * * * *